US008856133B2

(12) United States Patent
Iwai et al.

(10) Patent No.: US 8,856,133 B2
(45) Date of Patent: Oct. 7, 2014

(54) INFORMATION PROVIDING APPARATUS AND METHOD, TERMINAL APPARATUS AND INFORMATION PROCESSING METHOD, AND PROGRAM

(75) Inventors: Yoshiaki Iwai, Tokyo (JP); Shunichi Homma, Tokyo (JP); Akira Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 13/388,241

(22) PCT Filed: Jul. 27, 2010

(86) PCT No.: PCT/JP2010/062562

§ 371 (c)(1), (2), (4) Date: Apr. 3, 2012

(87) PCT Pub. No.: WO2011/016359

PCT Pub. Date: Feb. 10, 2011

(65) Prior Publication Data

US 2012/0179685 A1 Jul. 12, 2012

(30) Foreign Application Priority Data

Aug. 7, 2009 (JP) ................................ P2009-184416

(51) Int. Cl.
*G06F 17/30* (2006.01)
*H04L 12/66* (2006.01)
*H04L 12/64* (2006.01)

(52) U.S. Cl.
CPC ............ *H04L 12/66* (2013.01); *H04L 12/6418* (2013.01)
USPC .......................................................... 707/740

(58) Field of Classification Search
CPC ........................ G06F 17/30997; G06F 17/3028
USPC .......................................................... 707/740
See application file for complete search history.

(56) References Cited

U.S. PATENT DOCUMENTS

2006/0015582 A1* 1/2006 Morita et al. ................. 709/219
2009/0150328 A1* 6/2009 Silver ................................ 707/1
2009/0157696 A1* 6/2009 Mikawa et al. ................. 707/10

FOREIGN PATENT DOCUMENTS

JP 2003-444761 2/2003
JP 2004-178305 6/2004
JP 2006-171958 6/2006
JP 2007-334696 12/2007
JP 2009-157587 7/2009
JP 2009-163349 7/2009

OTHER PUBLICATIONS

International Search Report from the Japanese Patent Office, mailed Aug. 31, 2010, for International Application No. PCT/JP2010/062562.

* cited by examiner

*Primary Examiner* — Rehana Perveen
*Assistant Examiner* — Alexander Khong
(74) *Attorney, Agent, or Firm* — Finnegan, Henderson, Farabow, Garrett & Dunner, LLP

(57) ABSTRACT

An information providing apparatus, including a storage configured to store registration information as related with a category; recognition means configured to recognize the category corresponding to acquisition information acquired from a terminal apparatus; and communication means configured to transmit the registration information corresponding to the category of the acquisition information to the terminal apparatus.

19 Claims, 22 Drawing Sheets

12-1
TERMINAL APPARATUS
12-2
TERMINAL APPARATUS
13
NETWORK
11
SERVER
21
RECOGNITION DEVICE
22
INFORMATION DB
1

A
B
121
122
124
THIS PHONE
FIXED PHONE
PHONE (FIXED/MOBILE)
125-1
125-2
125-M
126
127-1
127-2
127-M
128
ALWAYS/1 DAY/IN Gp

A
B
C
DOG TYPE
DOG
CORGI
DALMATIAN
×××
143
142
144-1
144-2
144-M
145
146-1
146-2
123
Text: PERIODIC MEDICAL EXAMINATION
128
ALWAYS/2 DAYS/FAMILY

INFORMATION PROVIDING APPARATUS AND METHOD, TERMINAL APPARATUS AND INFORMATION PROCESSING METHOD, AND PROGRAM

TECHNICAL FIELD

The present invention relates generally to an information providing apparatus and method, a terminal apparatus and information processing method, and a program and, more particularly, an information providing apparatus and method, a terminal apparatus and information processing method, and a program that are configured for a user to obtain information without locational restrictions.

BACKGROUND ART

Recently, researches into AR (Argumented Reality) technologies in which information of a virtual space is superimposed on a real space to output resultant information gain popularity. For information presenting apparatuses based on AR technologies typically include a head-mounted output apparatus of a video see-through type equipped with a camera and a portable terminal. Use of these terminals allows information (a virtual object) to be superimposed on a video in a real space taken by the camera and the user to feel as if the virtual object were present in the real space.

For example, patent document 1 proposes that information is registered with a specific card and this card is recognized with a terminal camera, thereby superimposing the information (a virtual object) on the location where the card exists.

In addition, it is also proposed that information is added to a location identified by positional information obtained from GPS (Global Positioning System) and the added information is presented to a user who visits that location. Further, a system is proposed in which, in addition to positional information, information to be presented is changed in accordance with the orientation of a user by use of an electronic compass.

PRIOR ART DOCUMENT

Patent Document

Patent Document 1: Japanese Patent Laid-open No. 2006-171958

SUMMARY OF THE INVENTION

Technical Problems

However, the technique based on the AR technology disclosed in Patent Document 1 requires the preparation of a dedicated card beforehand and the addition of information at a specific place, thereby limiting the usability and convenience at various locations, which makes it difficult to obtain information independently of locations.

The present invention has been made in consideration of these situations and therefore is intended to provide a user with information without being limited by locations.

Technical Solution

In carrying out the invention and according to one aspect thereof, there are provided an information providing apparatus, an information providing method for this information providing apparatus, and a program for making a computer function as this information providing apparatus. This information providing apparatus has storage means configured to store registration information as related with a category; recognition means configured to recognize the category corresponding to acquisition information acquired from a terminal apparatus; and communication means configured to transmit the registration information corresponding to the category of the acquisition information recognized by the recognition means to said terminal apparatus.

In the above-mentioned information providing apparatus, the communication means receives first acquisition information that is the acquisition information from a first terminal apparatus; the recognition means recognizes a first category that is the category corresponding to the first acquisition information acquired from the first terminal apparatus; the communication means transmits the recognized first category to the first terminal apparatus and receives a predetermined category in the first category selected from the first terminal apparatus and the registration information related therewith; the storage means stores the received registration information as related with the selected predetermined category; the communication means receives second acquisition information that is the acquisition information from a second terminal apparatus and terminal information; the recognition means further recognizes a second category that is the category of the second acquisition information acquired from the second terminal apparatus; and, if the second category further recognized by the recognition means corresponds to the predetermined category and a setting condition in the registration information corresponding to the predetermined category is satisfied, the communication means transmits the registration information to the second terminal apparatus.

The first terminal apparatus and the second terminal apparatus are equal to each other.

The communication means further receives revision information from the terminal apparatus and the storage means revises the registration information on the basis of the revision information.

In the above-mentioned aspect of the present invention, registration information is stored as related with a category, a category corresponding to acquisition information acquired from a terminal apparatus is recognized, and registration information corresponding to acquisition information corresponding to the category of the recognized acquisition information is transmitted to the terminal apparatus.

In carrying out the invention and according to another aspect thereof, there is provided an information providing apparatus, and information providing method for this information providing apparatus, and a program for making a computer function as this information providing apparatus. This information providing apparatus has recognition means configured to recognize a category corresponding to acquisition information acquired from a terminal apparatus; communication means configured to communicate with the terminal apparatus; and storage means configured to store registration information received from the terminal apparatus by the communication means as related with the category, wherein the communication means receives first acquisition information that is the acquisition information from a first terminal apparatus, the recognition means recognizes a first category that is the category corresponding to the first acquisition information acquired from the first terminal apparatus, the communication means transmits the recognized first category to the first terminal apparatus and receives the first category selected by the first terminal apparatus and first registration information that is the registration information related therewith, the storage means stores the first registration information as related with the selected first category, the communication means transmits, to the second terminal apparatus, terminal information of the first terminal apparatus in the first registration information and an information transmission request for transmitting second acquisition information that is the acquisition information acquired by the second terminal apparatus and receives the second acquisition information from the second terminal apparatus, the recognition means recognizes a second category that is the category corresponding to the second acquisition information, and the communication means, if the second category corresponds to the first category, transmits the second acquisition information to the first terminal apparatus.

In the above-mentioned aspect of the invention, the category corresponding to the acquisition information acquired from the terminal apparatus is recognized, communication is executed with the terminal apparatus, the registration information received from the terminal apparatus is stored as related with the category, the first acquisition information that is the acquisition information is received from the first terminal apparatus, the first category that is the category corresponding to the first acquisition information acquired from the first terminal apparatus is recognized, the recognized first category is transmitted to the first terminal apparatus, the first category selected by the first terminal apparatus and the first registration information that is the registration information related therewith are received, the first registration information is stored as related with the selected first category, an information transmission request for transmitting the terminal information of the first terminal apparatus in the first registration information and the second acquisition information that is the acquisition information acquired by the second terminal apparatus are transmitted to the second terminal apparatus, the second acquisition information is received from the second terminal apparatus, the second category that is the category corresponding to the second acquisition information is recognized, and, if the second category corresponds to the first category, the second acquisition information is transmitted to the first terminal apparatus.

In carrying out the invention and according to still another aspect thereof, there are provided a terminal apparatus, an information processing method for this terminal apparatus, and a program for making a computer function as this terminal apparatus. This terminal apparatus has acquisition means configured to acquire acquisition information and registration information; communication means configured to communicate with an information providing apparatus; and selection means configured to select a received category from the information providing apparatus, wherein the communication means transmits first acquisition information that is the acquisition information to the information providing apparatus and receives a first category that is the category of the first acquisition information from the information providing apparatus, the selection means selects a predetermined category in the first category, the acquisition means acquires the registration information related with the selected first category, and the communication means transmits the selected first category and the registration information related therewith to the information providing apparatus and, after storing the first category and the registration information therein, transmits second acquisition information that is the acquisition information to the information providing apparatus, and, if a second category that is the category of the second acquisition information corresponds to the first category, receives the registration information from the information providing apparatus.

The above-mentioned terminal apparatus further has display condition acquisition means configured to acquire an display condition for displaying the registration information received from the information providing apparatus; a decision means configured to determine whether display of the registration information is permitted under the display condition acquired, by the display condition acquisition means; and display means configured to display the registration information on the basis of a result of the decision means.

In the above-mentioned aspect of the invention, the acquisition information and registration information are acquired, communication is executed with the information providing apparatus, the category received from the information providing apparatus is selected, the first acquisition information that is the acquisition information is transmitted to the information providing apparatus, the first category that is the category of the first acquisition information is received from the information providing apparatus, a predetermined category is selected from the first category, the registration information related with the selected first category is acquired, the selected first category and the registration information related therewith are transmitted to the information providing apparatus and, after storing these category and registration information, the second acquisition information that is the acquisition information is transmitted to the information providing apparatus and, if the second category that is the category of the second acquisition information corresponds to the first category, the registration information is received from the information providing apparatus.

In carrying out the invention and according to yet another aspect thereof, there are provided a terminal apparatus, an information processing method for this terminal apparatus, and a program for making a computer function as this terminal apparatus. This terminal apparatus has terminal information acquisition means configured to acquire own terminal information; communication means configured to transmit a permission request for requesting acquisition of acquisition information of another terminal apparatus and the own terminal information to the another terminal apparatus and receive a result of the information acquisition request and another terminal information from the another terminal apparatus; storage means configured to store the another terminal information as information for identifying the another terminal apparatus that acquires the acquisition information.

In the above-mentioned terminal apparatus, if a first terminal apparatus that is the own terminal apparatus operates as a second terminal apparatus that is the another terminal apparatus, the communication means receives the permission request and first terminal information of the first terminal apparatus and, if the permission request is not accepted, transmits a message thereof to the first terminal apparatus; if the permission request is accepted, the storage means stores the first terminal information; if the permission request is accepted, the terminal information acquisition means acquires second terminal information of the second terminal apparatus; and if the permission request is accepted, the communication means transmits the second terminal information to the first terminal apparatus.

In the above-mentioned aspect of the invention, in the terminal apparatus for acquiring, via the information providing apparatus, the acquisition information obtained by another terminal apparatus, own terminal information is acquired, the information acquisition request for requesting the acquisition information of another terminal apparatus and the own terminal information are transmitted to that another terminal apparatus, the result of the information acquisition information and another terminal information are received from that another terminal apparatus, and the received another terminal information is stored as the information for identifying that another terminal apparatus for acquiring the acquisition information.

In carrying out the invention and according to a different aspect thereof, there are provided a terminal apparatus, an information processing method, and a program for making a computer to function as this terminal apparatus. This terminal apparatus has acquisition means configured to acquire acquisition information and registration information; recognition means configured to recognize a category corresponding to the acquired acquisition information; selection means configured to select the category; storage means configured to store said registration information as related with said category, and output means configured to output the registration information, wherein the recognition means recognizes a first category that is the category corresponding to the first acquisition information that is the acquisition information, the selection means selects a predetermined category in the first category, the acquisition means acquires the registration information related with the selected first category, the storage means stores the registration information as related with the selected first category, the acquisition means further acquires second acquisition information that is the acquisition information, the recognition means further recognizes a second category that is the category of the second acquisition information, and if the second category further recognized by the recognition means corresponds to the first category and a setting condition in the registration information corresponding to the first category is satisfied, the output means outputs the registration information.

In the above-mentioned aspect of the invention, the first category that is the category corresponding to the first acquisition information that is the acquisition information is recognized, a predetermined category in the first category is selected, the registration information related with the selected first category is acquired, the register information is stored as related with the selected first category, the second acquisition information that is the acquisition information is further acquired, the second category that is the category of the second acquisition information is further recognized, and, if the recognized second category corresponds to the first category and the setting condition in the registration information corresponding to the first category is satisfied, the registration information is outputted.

Advantageous Effect

According to the aspects of the present invention, information can be provided to a user without locational restrictions.

MODE FOR CARRYING OUT THE INVENTION

This invention will be described in further detail by way of example with reference to the accompanying drawings. It should be noted that the description will be made in the following order:

1. the first embodiment (an information providing system);
2. the second embodiment (an information providing apparatus); and
3. the third embodiment (an information acquisition system).

<The First Embodiment>

[Configuration of an Information Providing System]

Figure 1:
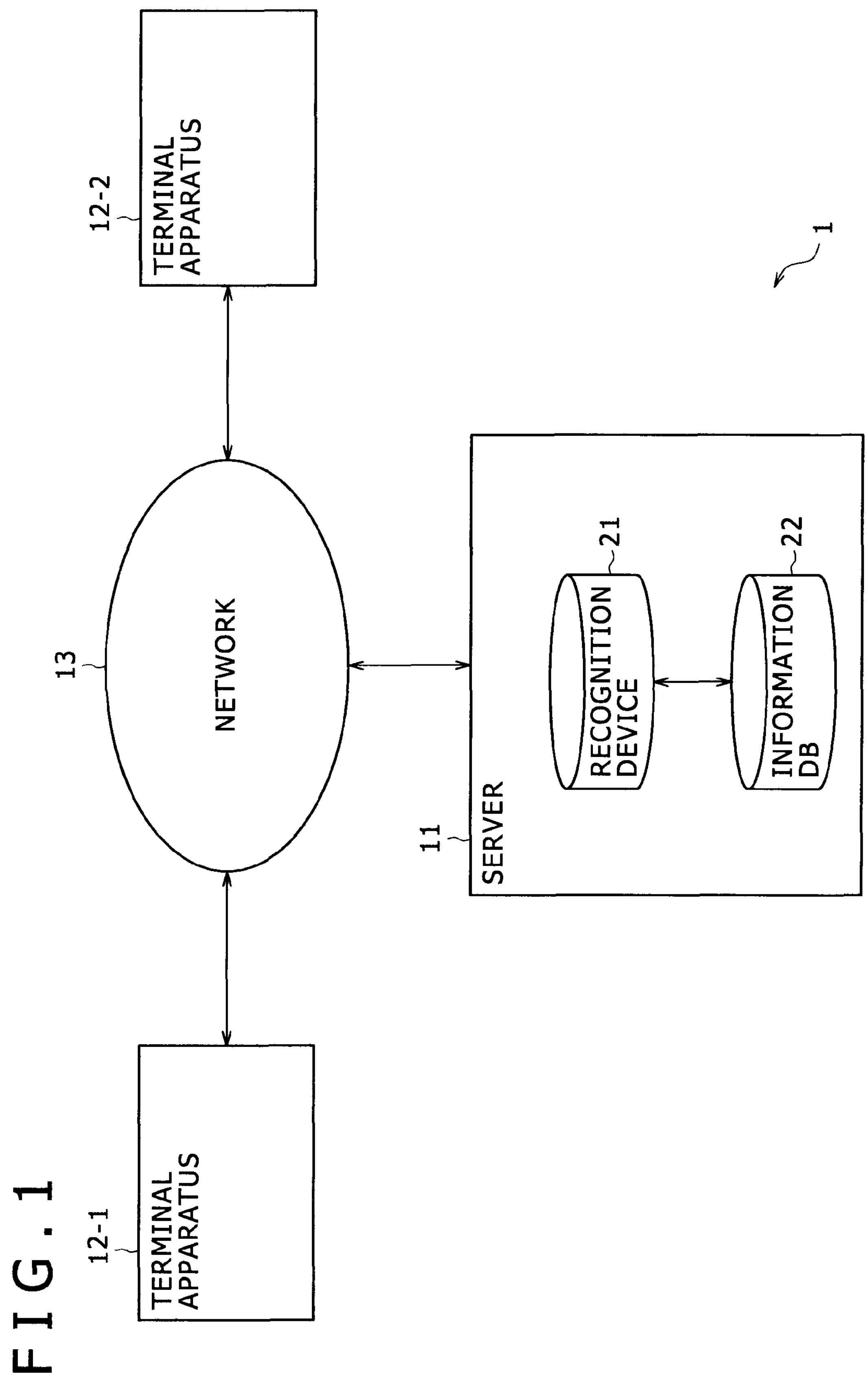
[FIG. 1] A schematic diagram illustrating an exemplary configuration of an information providing system practiced as one embodiment of the present invention.

FIG. 1 is a diagram illustrating an exemplary configuration of an information providing system 1 practiced as one embodiment of the present invention.

The information providing system 1 shown in FIG. 1 is configured by a server 11, terminal apparatuses 12-1 and 12-2, and a network 13. The server 11 has a recognition device 21 and an information database (DB) 22. It should be noted that the terminal apparatuses 12-1 and 12-2 are generically referred to as the terminal apparatus 12 unless otherwise noted.

Between the server 11 and the terminal apparatus 12, information are transmitted and received via the network 13 including the Internet, a telephone line, and other networks.

Figure 2:
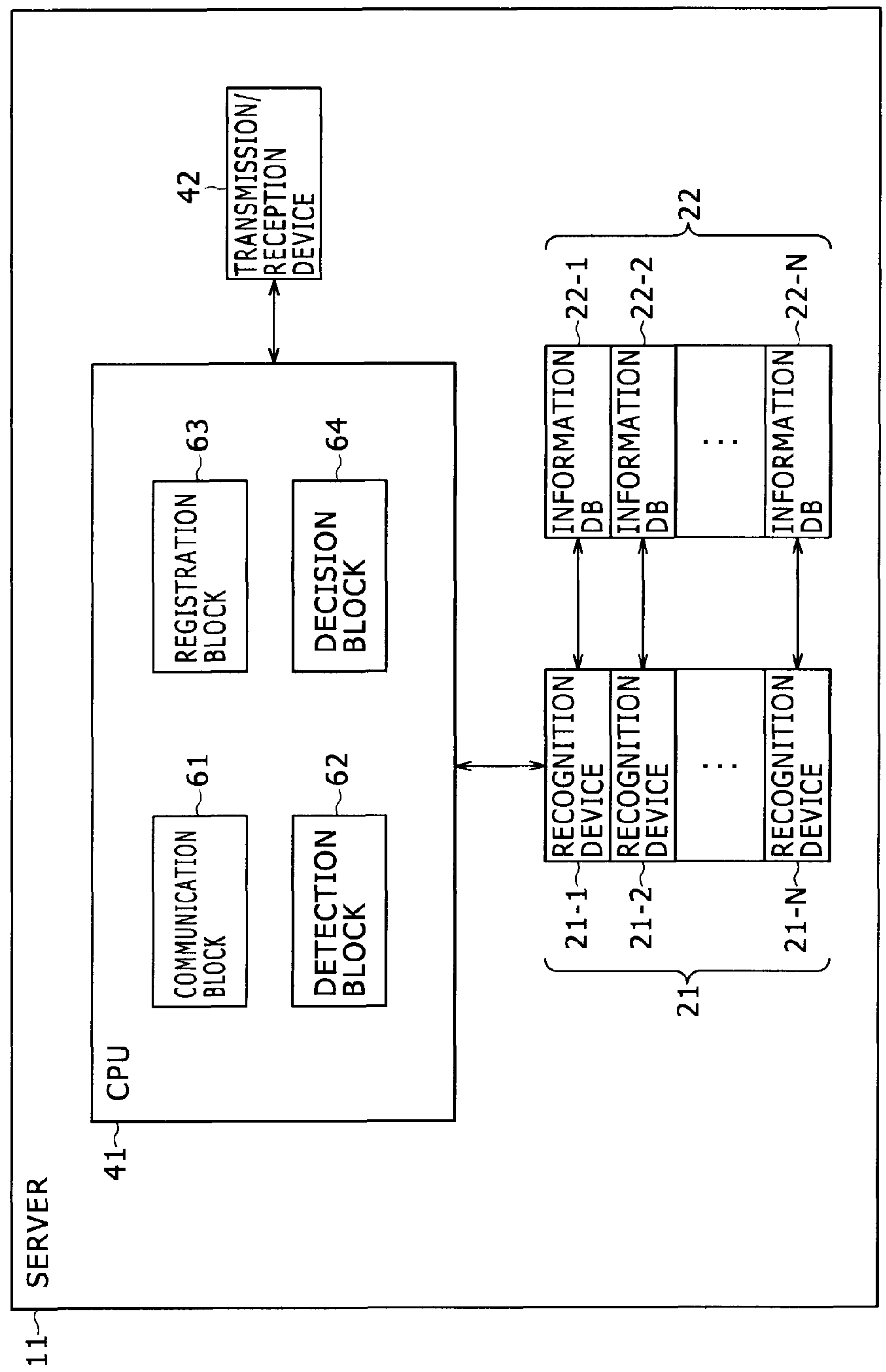
[FIG. 2] A block diagram illustrating an exemplary configuration of a server of the information providing system.

FIG. 2 is a block diagram illustrating an exemplary configuration of the server 11 of the information providing system 1 shown in FIG. 1.

In the example shown in FIG. 2, the server 11 is configured by recognition devices 21-1 through 21-N (N being an integer of 1 or higher), the information DBs 22-1 through 22-N, a CPU (Central Processing Unit) 41, and a transmission/reception device 42. The CPU 41 has functional blocks that are a communication block 61, a detection block 62, a registration block 63, and a decision block 64. It should be noted that the recognition devices 21-1 through 21-N and the information DBs 22-1 through 22-N are generically referred to as the recognition device 21 and the information DB 22, respectively, unless otherwise noted.

The recognition device 21 is connected to the CPU 41. Each of the recognition devices 21-1 through 21-N is connected to corresponding each of the information DBs 22-1 through 22-N. The recognition device 21 recognizes a category of obtained information. Namely, if an image has been entered, the recognition device 21 extracts the feature quantity of the entered image and executes pattern matching to recognize the category of this image. Alternatively, if a character has been entered, the recognition device 21 references a dictionary to recognize the category of this character.

The recognition device 21 can be arranged on the terminal apparatus 12; however, arranging the recognition device 21 on the server 11 makes information sharing easier.

The information DB 22 registers, via the corresponding recognition device 21, the information supplied from the registration block 63.

The CPU 41 executes various processing operations of the server 11. The communication block 61 executes the processing of communication with the terminal apparatus 12 via the transmission/reception device 42. The detection block 62 supplies an image that is obtained information to the recognition device 21 and executes the processing of detecting a predetermined one of two or more recognition devices 21-1 through 21-N. The registration block 63 executes the processing of registering the information obtained from the communication block 61 into the information DB 22 corresponding to the recognition device 21 via the recognition device 21. The decision block 64 executes the processing of determining whether the information registered in the information DB 22 is inside a range of a condition obtained from the terminal apparatus 12. It should be noted that each of the functional blocks making up the CPU 41 is configured to mutually receive data as required.

The transmission/reception device 42 executes the transmission and reception of information with the terminal apparatus 12 via the network 13 under the control of the communication block 61.

Figure 3:
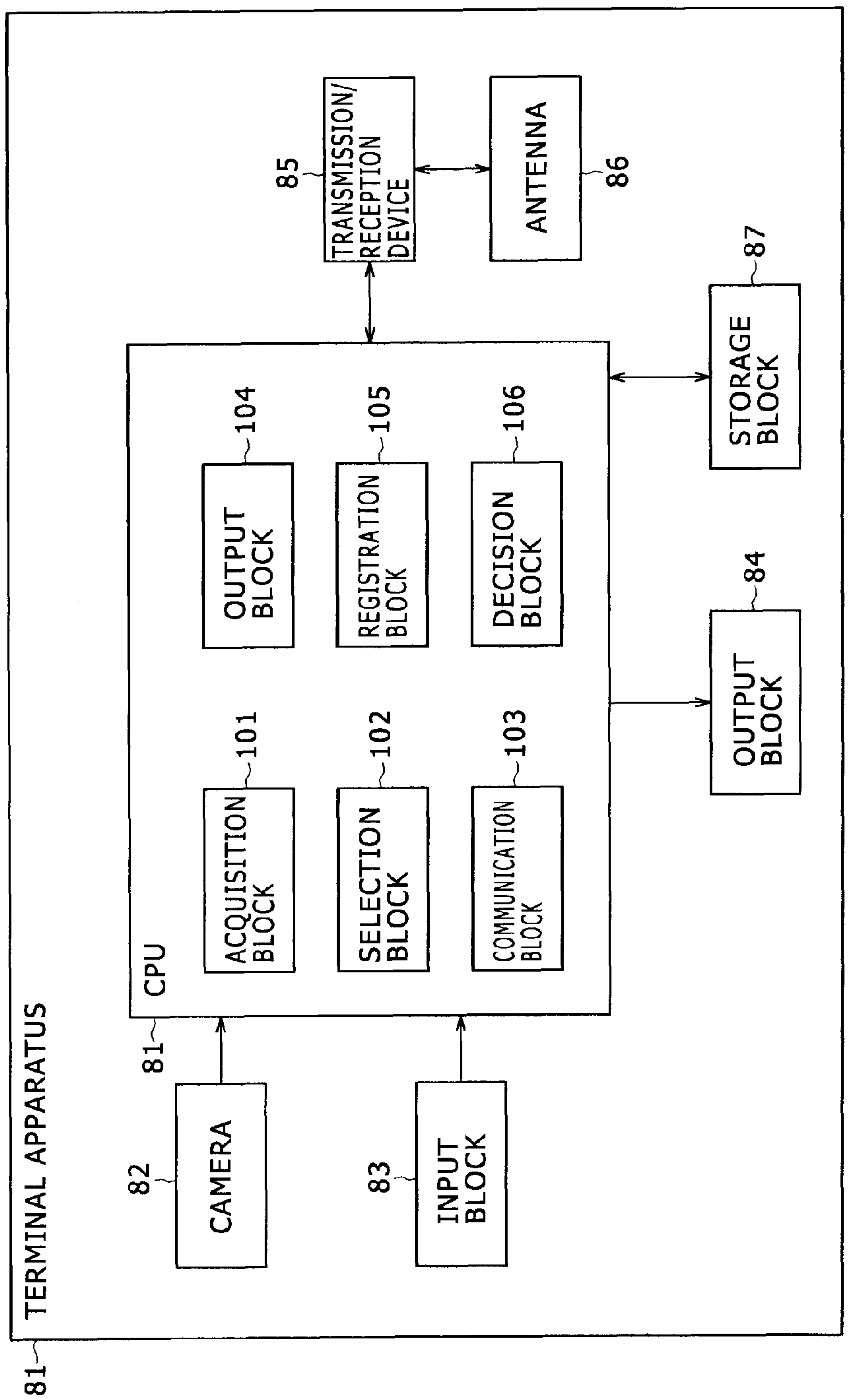
[FIG. 3] A block diagram illustrating an exemplary configuration of a terminal apparatus of the information providing system.

FIG. 3 is a block diagram illustrating an exemplary configuration of the terminal apparatus 12 of the information providing system 1 shown in FIG. 1.

For example, the terminal apparatus 12 configured by a mobile phone is configured by a CPU 81, a camera 82, an input block 83, an output apparatus 84, a transmission/reception device 85, an antenna 86, and a storage block 87. The CPU 81 has functional blocks that are an acquisition block 101, a selection block 102, a communication block 103, an output block 104, a registration block 105, and a decision block 106.

The CPU 81 executes various processing operations of the terminal apparatus 12. The acquisition block 101 that is a functional block of the CPU 81 obtains an image taken by the camera 82 or information entered through the input block 83. The selection block 102 executes the processing of selecting a recognition device, a recognition device name, a target object, a representative image, and so on. The communication block 103 executes the communication with the server 11 via the network 13 from the transmission/reception device 85 and the antenna 86. The output block 104 executes the processing of displaying images and so on taken by the camera 82. The registration block 105 executes the processing of supplying terminal information (for example, ID (Identification) and so on) of another terminal apparatus 12 to the storage block 87 to register the terminal information. The decision block 106 executes various decision processing operations, such as the ID of another terminal apparatus 12 is included in the ID of the terminal apparatus 12 to which transmission can be executed when an image is transmitted to another terminal apparatus 12, for example.

The camera 82 takes images of subjects of image taking. Each taken image is obtained by the acquisition block 101 of the CPU 81.

The input block 83 is connected to the CPU 81. The input block 83 is made up of a user interface such as keys, switches, and buttons, for example.

The output apparatus 84 is made up of a display based on LCD (Liquid Crystal Display) or the like, a speaker, or image and audio output terminals, for example.

The transmission/reception device 85 is connected from the antenna 86 to the network 13 in a wireless manner and executes transmission and reception of various kinds of information with the server 11 and other terminal apparatus 12.

The storage block 87 stores the terminal information and the like of the terminal apparatus.

Figure 4:
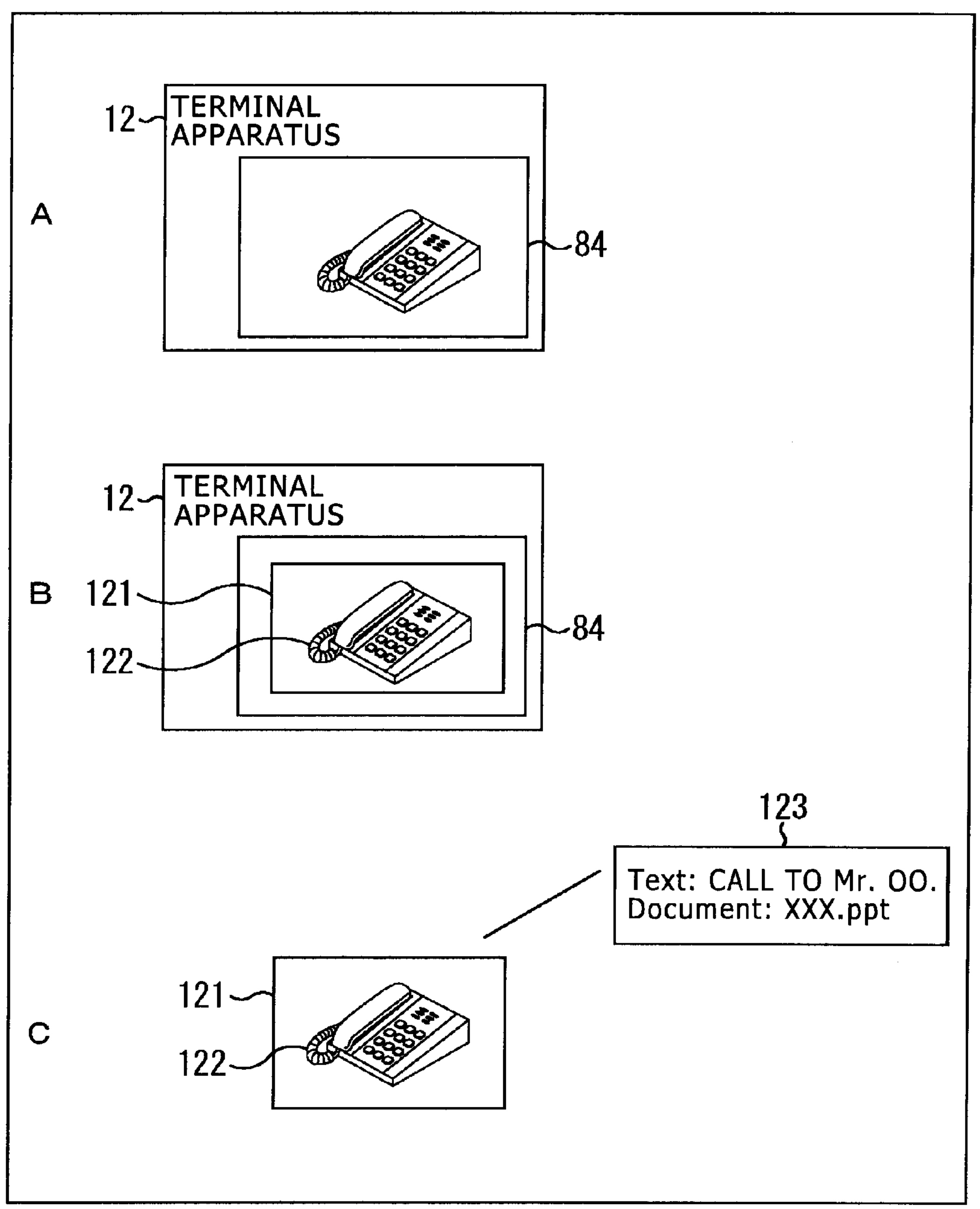
[FIG. 4] A diagram illustrating an exemplary output image.
Figure 5:
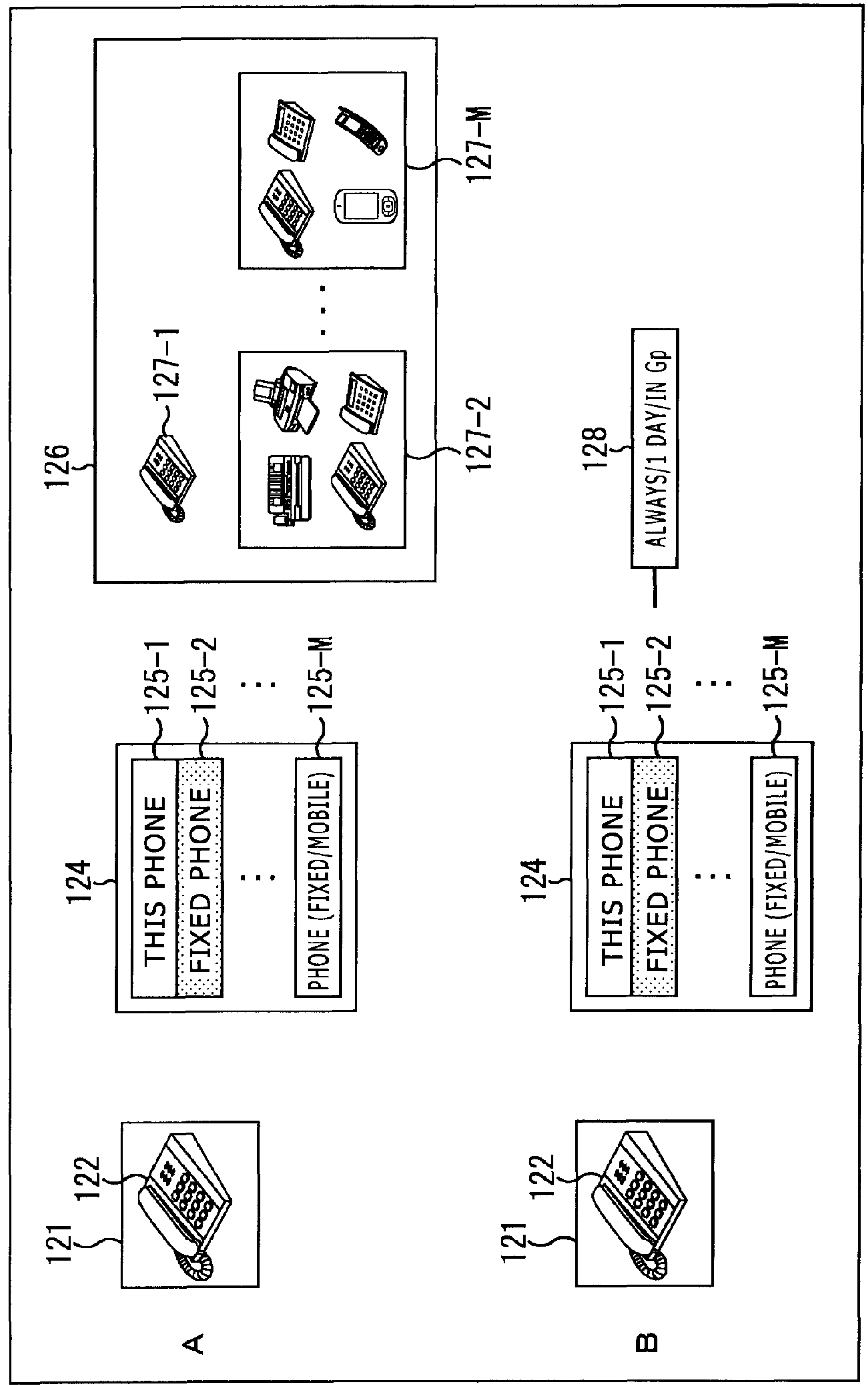
[FIG. 5] A diagram illustrating an exemplary output image.

FIG. 4 and FIG. 5 show diagrams illustrating exemplary images that are outputted from the output apparatus 84.

A of FIG. 4 shows a diagram illustrating an exemplary image that is displayed on the terminal apparatus 12. B of FIG. 4 is a diagram illustrating an exemplary image with a target area 121 specified from the image of A of FIG. 4. An object inside the area specified by the target area 121 becomes a target object 122. C of FIG. 4 is a diagram illustrating an example in which additional information 123 is added to the target object 122. The additional information 123 is characters, audio, still image or moving image, for example.

A of FIG. 5 is a diagram illustrating an example of a recognition device list 124 corresponding to the target object 122 and a representative image list 126 thereof. The recognition device list 124 is a list of recognition names 125-1 through 125-M (M being an integer of 1 or higher) that are the names of one or more recognition devices 21 detected from two or more recognition devices 21-1 through 21-N. Each recognition name is indicative of a category. The representative image list 126 is a list of representative images 127-1 through 127-M corresponding to the recognition device names 125-1 through 125-M. The representative images 127-1 through 127-M are convenient for determining a level in the layer of the corresponding recognition names 125-1 through 125-M. It should be noted that, hereafter, the recognition device names 125-1 through 125-M and the representative images 127-1 through 127-M will be generically referred to as the recognition device name 125 and the representative image 127, respectively, unless otherwise noted.

B of FIG. 5 is a diagram illustrating an example of a setting condition 128. The setting condition 128 is a condition that is set when providing such information as information presentation/acquisition function, the time zone, period, location, and range of presentation, and so on, for example. For the time zone, morning or evening can be specified in addition to the specification in a specific time. For the period, one day, one week, one month, one year, and so on can be specified. For the range, user only, family, friend, and so on can be specified.

[Flow of Processing]

Figure 6:
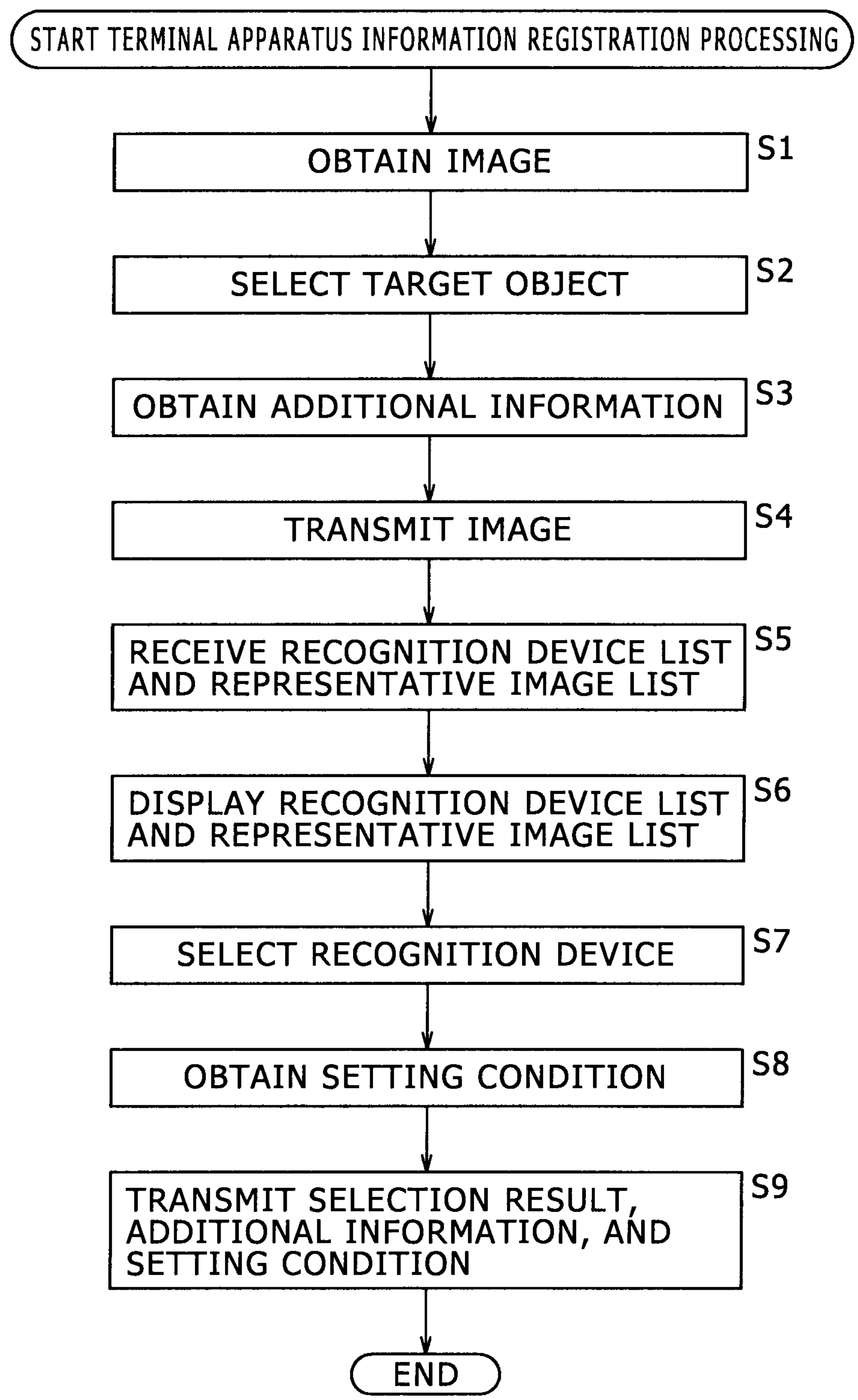
[FIG. 6] A flowchart indicative of one example of information registration processing of the terminal apparatus.

FIG. 6 is a flowchart indicative of one example of the information registration processing of the terminal apparatus 12. The following describes an operation of registering information into the server 11 by the user through the own terminal apparatus 12-1 with reference to FIG. 6.

In step S1, the user takes, through the camera 82, a subject associated with information to be registered. The acquisition block 101 obtains the image that is the obtained information taken with the camera 82. The output apparatus 84 displays the obtained image as shown in A of FIG. 4, for example. In this example, an image of a fixed phone that is the subject of image taking is displayed approximately at the center.

In step S2, the user selects a predetermined target area in a displayed image by operating the input block 83. When this operation is executed, the selection block 102 selects an image of a target area 121 specified from obtained images as a target object 122 as shown in B of FIG. 4. In this example, the image of the fixed phone is the target object 122.

In step S4, the user enters additional information to be added in association with the target object 122 through the input block 83 as registration information. In the example shown in C of FIG. 4, message "Call Mr. OO" and the fact that the document is "xxx.ppt" are added to the target object 122 as additional information 123. The acquisition block 101 obtains the entered additional information 123.

In step S4, the communication block 103 supplies an image of the selected target object 122 to the transmission/reception device 85 along with the additional information 123 for the transmission from the antenna 86 to the server 11 via the network 13.

As will be described later with reference to FIG. 7, the server 11 detects a candidate of the recognition device 21 of the target object 122 (step S22) and transmits the recognition device list 124 (refer to A of FIG. 5) that is a list of the names of candidates and the representative image list 126 (refer to A of FIG. 5) that is a list of representative images corresponding to the candidates (step S23).

Therefore, in step S5, the communication block 103 controls the transmission/reception device 85 to receive the recognition device list 124 and the representative image list 126.

In step S6, the output block 104 supplies the received recognition device list 124 and representative image list 126 to the output apparatus 84, which displays these lists.

In the example of A of FIG. 5, the recognition device list 124 shows the names of candidates of the recognition devices; "This phone" 125-1, "Fixed phone" 125-2 . . . "Phone (fixed/mobile) 125-M. The representative image list 126 shows the representative images 127-1 through 127-M corresponding to the recognition device names 125-1 through 125-M of the candidates of the recognition devices.

In step S7, the user selects the representative image that is considered the nearest to the target object 122 from among the representative images 127-*i* (i=1, 2, . . . , M) and specifies the recognition device name of the candidate of the corresponding recognition device from the recognition device name 125-*i* (i=1, 2, . . . , M) by operating the input block 83. The selection block 102 selects the recognition device having the recognition device name specified from the recognition device list 124 as described above as the recognition device corresponding to the final target object 122. In the example shown in A of FIG. 5, the recognition device 21 having recognition device name "Fixed phone" is selected.

Next, the user operates the input block 83 to enter the setting condition 128 for supposing a condition for the case in which registration information is provided. In the example shown in B of FIG. 5, the setting condition 128 is set such that the time zone for providing registration information is "Always," the period is "one day," and the terminal apparatus 12 for which registration information is provided is a terminal apparatus of "inside group (Gp)." In step S8, the acquisition block 101 obtains the entered setting condition 128.

In step S9, the communication block 103 supplies a selection result of the recognition device name 125 selected in step S7, the additional information 123 obtained in step S3, and the setting condition 128 obtained in step S8 to the transmission/reception device 85, thereby transmitting these items of information from the antenna 86 to the server 11 via the network 13. Here, the information registration processing of the terminal apparatus 12-1 comes to an end.

As described above, registering information as related with images allows the relation of information not only with a non-moving objects but also with moving objects.

Figure 7:
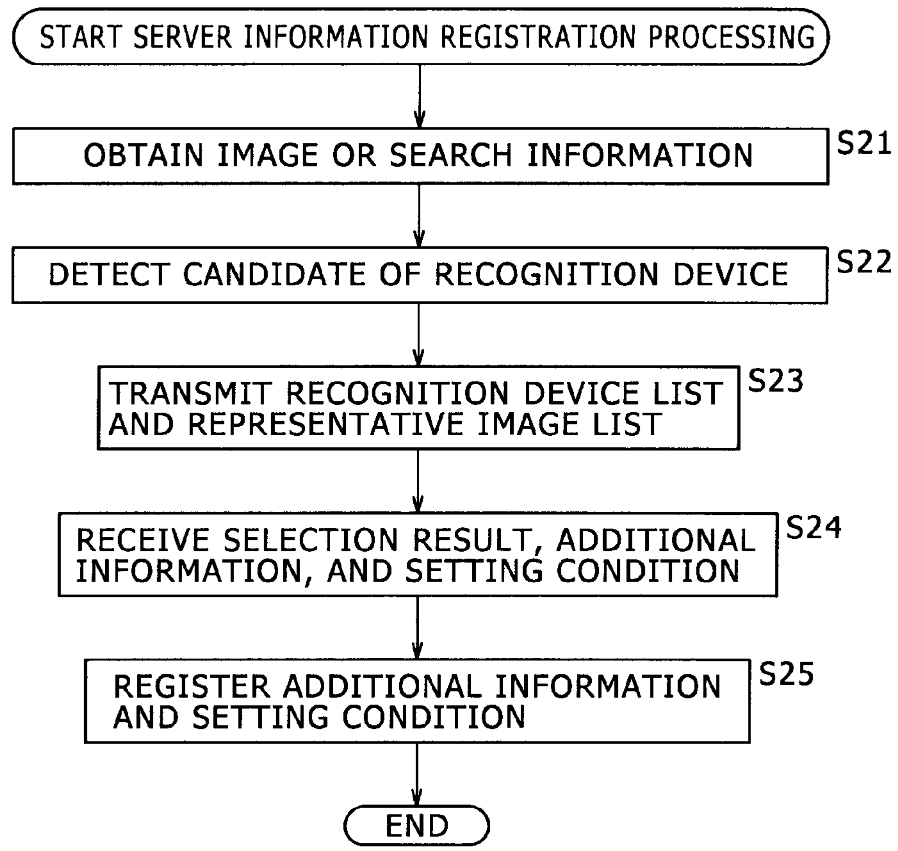
[FIG. 7] A flowchart indicative of one example of information registration processing of the server.

In accordance with the processing shown in FIG. 6 of the terminal apparatus 12 described above, the server 11 executes processing shown in FIG. 7.

FIG. 7 shows a flowchart indicative of one example of information registration processing of the server 11.

In step S21, the communication block 61 controls the transmission/reception device 42 to receive the image or the search information transmitted from the terminal apparatus 12-1 in step S4 of FIG. 6. The search information will be described later with reference to FIG. 8 through FIG. 10.

In step S22, the detection block 62 supplies the image received in step S21 to the recognition device 21, thereby detecting a candidate of the recognition device 21 from among the recognition devices 21-1 through 21-N. To be more specific, for the recognition device 21 that recognizes a category of obtained information, categories to recognize are determined in advance. In order to recognize two or more categories, the recognition devices 21-1 through 21-N for all categories are prepared. The recognition devices 21-1 through 21-N recognize the category of the image of the target object 122 as obtained information. Now, because the image of the target object 122 is an image of phone, only the recognition device 21 allocated with the category associated with the phone can recognize the category of the image of the target object 122. The recognition device 21 that could recognize the category of the image of the target object 122 is detected as the final candidate of the recognition device 21.

In the example shown in A of FIG. 5, the recognition devices 125-1, 125-2, . . . , 125-M allocated with categories such as "This phone," "Fixed phone," . . . , "Phone (fixed/mobile)" are candidates.

In step S23, the communication block 61 supplies the recognition device list 124 in which the recognition device names 125 of the detected candidates of the recognition device 21 are listed and the representative image list 126 in which the representative images 127 corresponding to the detected candidates of the recognition device 21 are listed to the transmission/reception device 42 to transmit these lists to the terminal apparatus 12-1 via the network 13.

As described above, these lists are received by the terminal apparatus 12-1 in step S5 shown in FIG. 6. Then, in step S9 shown in FIG. 6, the recognition device name selection result, additional information, and setting condition are transmitted from the terminal apparatus 12-1.

In step S24, the communication block 61 controls the transmission/reception device 42 to receive the selection result, additional information 123, and setting condition 128 transmitted from the terminal apparatus 12-1.

In step S25, via the recognition device 21 (the recognition device 21-2 for example) corresponding to the selected recognition device name 125 (the recognition device name 125-2, in the case of A of FIG. 5), the registration block 63 supplies the additional information 123 and the setting condition 128 to a corresponding information DB 22 (the information DB 22-2 for example) to register these additional information and setting condition. Here, the information registration processing of the server 11 comes to an end.

It is also practicable for two or more users to register the information thereof to the same recognition device 21.

[Registration by Keyword]

In the above, information is registered with an image taken by taking an image of a subject as obtained information. It is also practicable to register information with a keyword as obtained information. The following describes an embodiment of this case with reference to FIG. 8 through FIG. 10.

Figure 8:
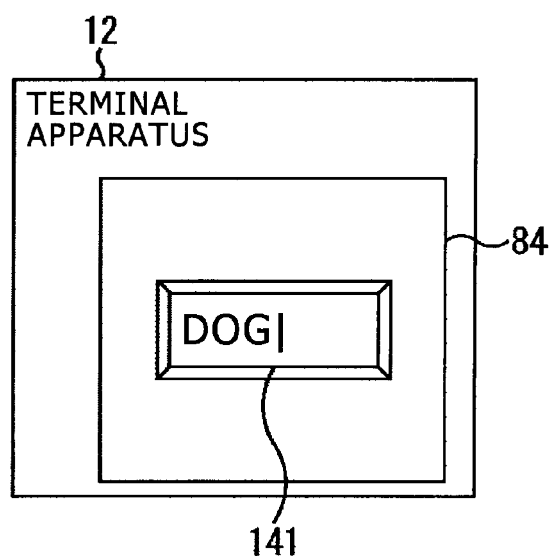
[FIG. 8] A diagram illustrating an exemplary output image.
Figure 9:
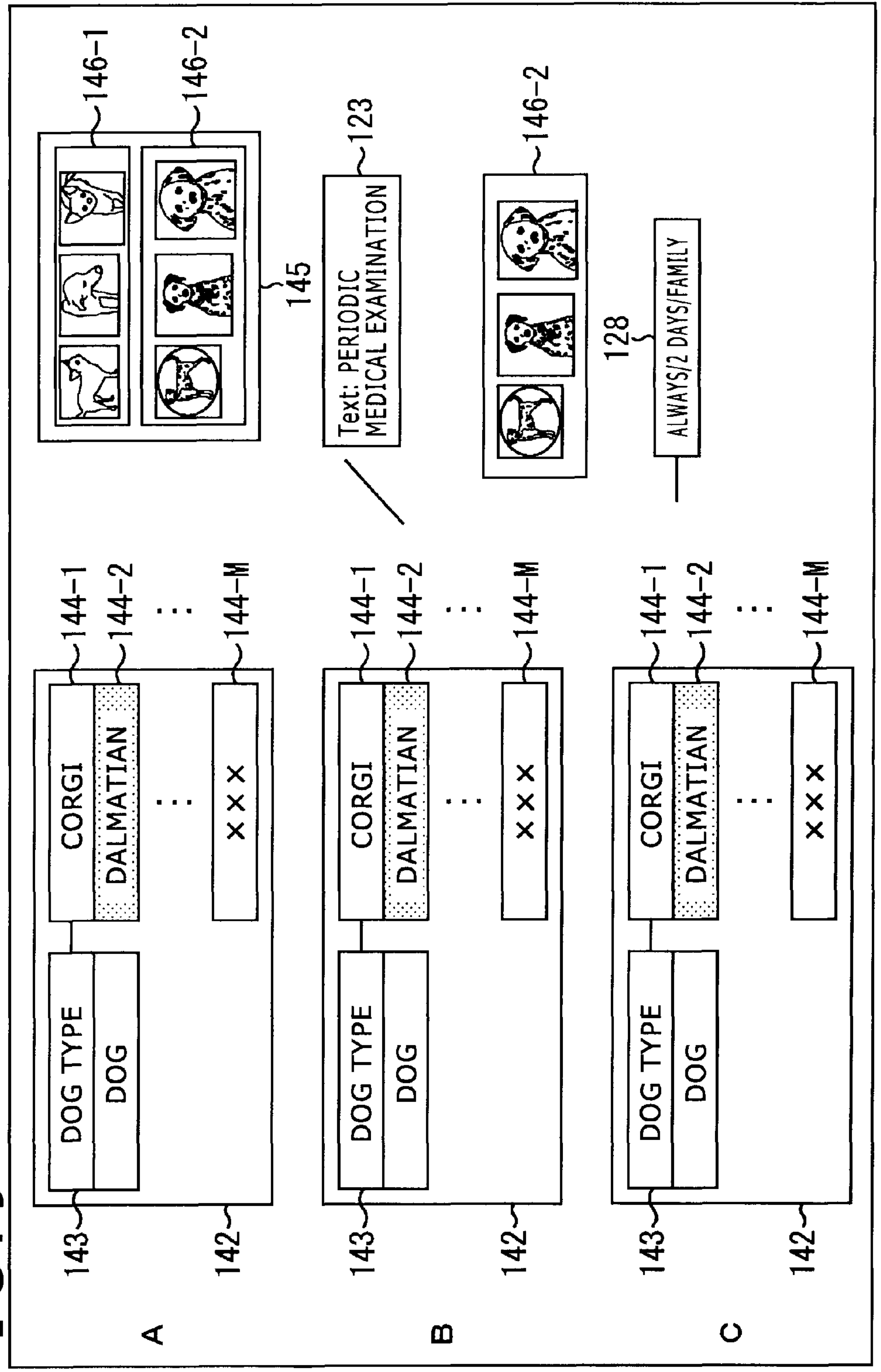
[FIG. 9] A diagram illustrating an exemplary output image.

FIG. 8 and FIG. 9 are diagrams illustrating exemplary images outputted from the output apparatus 84. FIG. 8 is a diagram illustrating exemplary information registration processing by search information 141. Here, a state in which keyword "dog" entered as the search information 141 is displayed is shown.

A of FIG. 9 is a diagram illustrating a display example in which the search information 141 of FIG. 8 is transmitted to the recognition device 21 to detect candidates of the recognition device 21 corresponding to the category of the search information 141 and a recognition device list 142 listing the names of the detected candidates of the recognition device 21 and a representative image list 145 thereof are displayed. The recognition device list 142 displays the upper recognition device names 143 and lower more detail recognition devices names 144-1 through 144-M. The representative image list 145 displays representative images 146-1 through 146-M corresponding to the recognition device name 143 and the recognition device names 144-1 through 144-M, respectively. It should be noted that A of FIG. 9 displays only the representative images 146-1 and the 146-2 for the convenience of presentation. It should also be noted however that the recognition device names 144-1 through 144-M and the representative images 146-1 through 146-M are hereafter generically referred to as the recognition device name 144 and the representative image 146 unless otherwise noted.

B of FIG. 9 is a diagram illustrating an example in which the recognition device name 144 is selected and the additional information 123 is added thereto. C of FIG. 9 is a diagram illustrating a state in which the setting condition 128 is added to the selected recognition device name 144.

It should be noted that, in FIG. 9, the recognition device list 142 displays two layer categories, namely, the upper recognition device name 143 and the lower recognition device name 144; however the number of layers is not limited to two. Likewise, three images are shown to the representative image list 145 as the representative image 146 corresponding to one category; however, the number of images is not limited to three.

Figure 10:
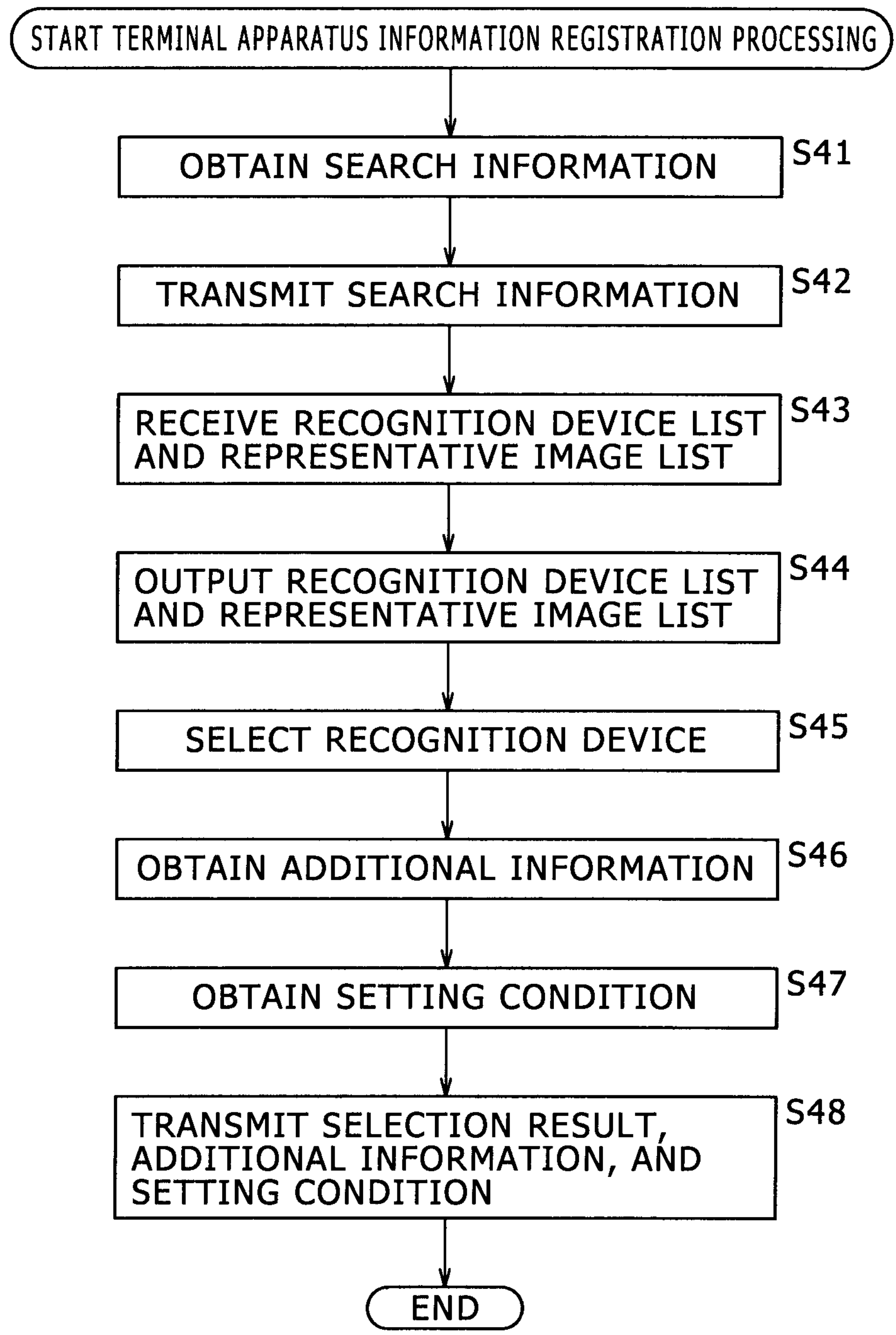
[FIG. 10] A flowchart indicative of one example of information registration processing of the terminal apparatus.

The following describes an operation to be executed when information is registered on the basis of keywords with reference to the flowchart shown in FIG. 10.

FIG. 10 shows a flowchart indicative of one example of information registration processing of the terminal apparatus 12-1. It should be noted that the processing of the server 11 corresponding to this processing of terminal apparatus 12-1 is the same as shown in FIG. 7.

By operating the input block 83, the user enters a keyword of a category for registering information. For example, if keyword "dog" is entered, it is displayed on the output apparatus 84 as search information 141 as shown in FIG. 8. In step S41, the acquisition block 101 obtains the entered search information 141.

In step S42, the communication block 103 supplies the search information 141 to the transmission/reception device 85 to transmit the search information 141 from the antenna 86 to the server 11 via the network 13.

Receiving the search information 141 in step S21 of FIG. 7, then the server 11 detects candidates of the recognition device 21 corresponding to the search information 141 in step S22 and transmits the recognition device list 142 and the representative image list 145 in step S23.

So, in step S43, the communication block 103 controls the transmission/reception device 85 to receive the recognition device list 142 and the representative image list 145 transmitted from the server 11.

In step S44, the output block 104 supplies the received recognition device list 142 and representative image list 145 to the output apparatus 84 to display these lists. In the display example shown in A of FIG. 9, the recognition device list 142 including the upper recognition device names 143 of "dog type" and "dog," and the lower recognition device name 144-1 of "Corgi," the lower recognition device name 144-2 of "Dalmatian," and the lower recognition device name 144-M of "xxx" is displayed. In addition, the representative image list 145 of the representative image 146-1 corresponding to the recognition device name 141-1 of "Corgi" and the representative image 146-2 corresponding to the recognition device name 144-2 of "Dalmatian" is displayed.

By operating the input block 83, the user selects one recognition device name from among the recognition device names 144-1 through 144-M. On the basis of this operation, in step S45, the selection block 102 selects one recognition device name 144 from the recognition device list 142, by which the name of "Dalmatian," namely, the recognition device name 144-2 of the category is selected in the display example shown in A of FIG. 9.

Further, by operating the input block 83, the user enters additional information to be related with the category of the selected recognition device name 144. In step S46, the acquisition block 101 obtains the entered additional information 123. In the display example shown in B of FIG. 9, the additional information 123 of "periodic medical examination" is added.

Next, by operating the input block 83, the user enters a setting condition. In step S47, the acquisition block 101 obtains the entered setting condition 128. In the display example shown in C of FIG. 9, the setting condition 128 is that the time zone in which information is provided is "Always," the period is "two days," and the target of provision is "family."

In step S48, the communication block 103 supplies the selection result of the recognition device name 125 selected in step S45, the additional information 123 obtained in step S46, and the setting condition 128 obtained in step S47 to the transmission/reception device 85 to transmit the supplied information from the antenna 86 to the server 11 via the network 13. Here, the information registration processing of the terminal apparatus 12-1 comes to an end.

For the above-mentioned processing of the terminal apparatus 12-1, the server 11 executes the registration processing as described above with reference to the flowchart shown in FIG. 7.

[Acquisition of Information]

The user can be provided with the information registered as described above in different periods and at different locations. Obviously, the user can be provided with the information at the same location.

Figure 11:
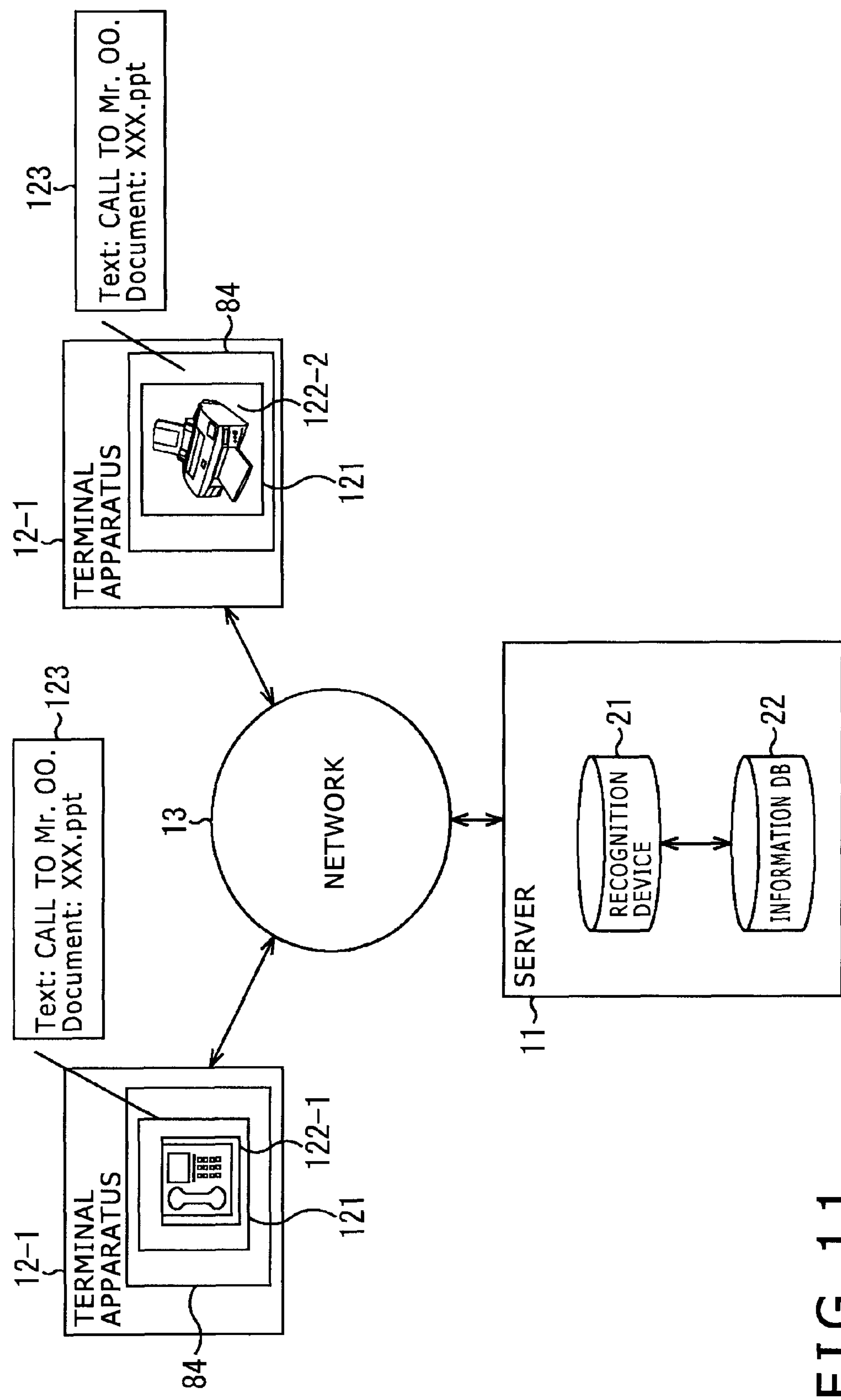
[FIG. 11] A diagram illustrating one example of information acquisition processing.

FIG. 11 is a diagram illustrating one example of information acquisition processing.

In FIG. 11, the terminal apparatus 12-1 at location A shown on the left side specifies a target object 122-1 and registers additional information 123 into the server 11 by executing the above-mentioned information registration processing. The terminal apparatus 12-1 at location B shown on the right side in FIG. 11 can select the recognition device name 125 of a category of any width when selecting the recognition device name 125. For example, by use of the terminal apparatus 12-1 at location A, the user selects "fixed phone" for the name (or the category) of the recognition device name 125 for the target object 122-1 and registers the additional information 123. Next, if the user moves to location B and obtains there an image of the target object 122-2 different from the target object 122-1 and transmits the obtained image to the server 11, then the user can obtain the additional information 123 registered for the target object 122-1 if the category of "fixed phone" is detected by the recognition device 21 of the server 11 from the image of the target object 122-2. In this case, if a higher category is detected, the information related with the recognition device 21 of a lower category can be provided.

As described above, by relating categories with individually different images (obtained information), the provision of information is facilitated.

The following describes the specific processing to be executed when the information registered by the user in the server 11 is provided.

Figure 12:
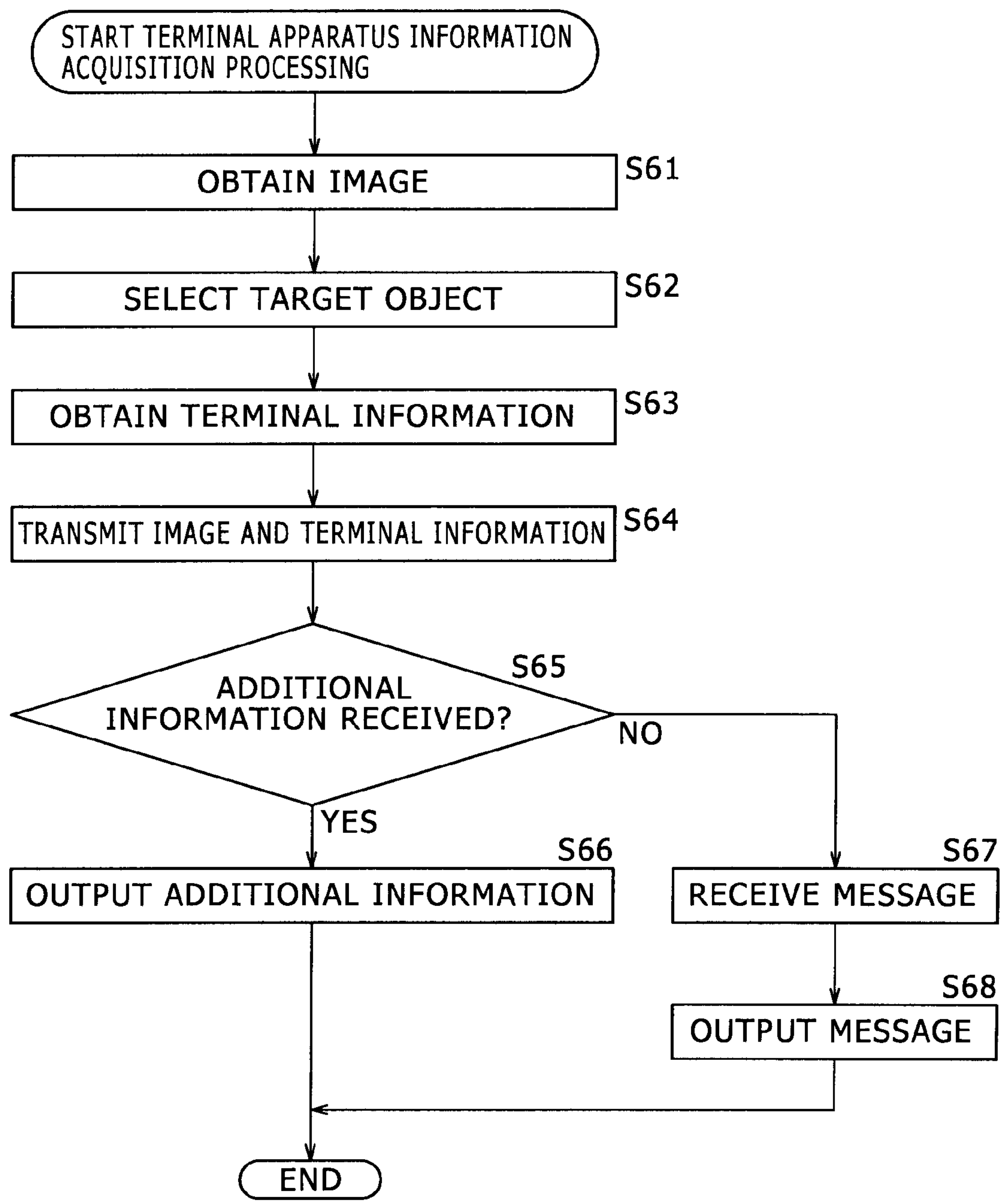
[FIG. 12] A flowchart indicative of one example of information acquisition processing of the terminal apparatus.

FIG. 12 is a flowchart indicative of one example of information acquisition processing of the terminal apparatus 12-1. This processing supposes that the information registration processing at location A by the terminal apparatus 12-1 indicated in FIG. 6, FIG. 7 and FIG. 10 have been completed.

At location B, the user takes an image of a subject by use of the same terminal apparatus 12-1 as that used at executing registration. Thus subject has the category at the time of information registration or a higher category than that. In step S61, the acquisition block 101 obtains the image taken by the camera 82. The obtained image is displayed on the output apparatus 84.

By operating the input block 83, the user specifies a target area 121 to be recognized from the obtained image. In step S62, the selection block 102 selects an image in the target area 121 as a target object 122. The processing operations of steps S61 and S62 described above are the same as those of steps S1 and S2 shown in FIG. 6.

In step S63, the acquisition block 101 obtains terminal information stored in the storage block 87 in advance. The terminal information is ID and so on for identifying the terminal apparatus 12.

In step S64, the communication block 103 supplies the image of the target object 122 and the terminal information to the transmission/reception device 85 to transmit the image and terminal information from the antenna 86 to the server 11 via the network 13.

As will be described later with reference to FIG. 13, if additional information is registered in the category to which the target object 122 belongs and the setting condition is satisfied, the server 11 transmits the additional information (step S85 shown in FIG. 13). If the additional information has not been registered or if the additional information has been registered but the setting condition is not satisfied, then a message thereof is transmitted from the server 11 (step S86 shown in FIG. 13).

Therefore, in step S65, the communication block 103 determines whether the transmission/reception device 85 has received the additional information 123 or not.

If the additional information 123 is received, then, in step S66, the output block 104 supplies the additional information 123 to the output apparatus 84 as the received registration information to display the additional information. Consequently, the user can obtain, at location B, the information registered in the server 11 at location A. Namely, in the example shown in FIG. 11, the user can obtain, at location B, the additional information 123 "Call Mr. OO" and "xxx.ppt" registered at location A and check the obtained additional information.

If the additional information 123 has not been received, then a message thereof is transmitted from the server 11 as described above. In this case, the communication block 103 receives the message from the transmission/reception device 85 in step S67.

In step S68, the output block 104 supplies the received message to the output apparatus 84 to display the received message. Consequently, the user can confirm that information cannot be provided because the registration information has not been registered or the condition is not satisfied. Here, the information acquisition processing of the terminal apparatus 12-1 comes to an end.

Figure 13:
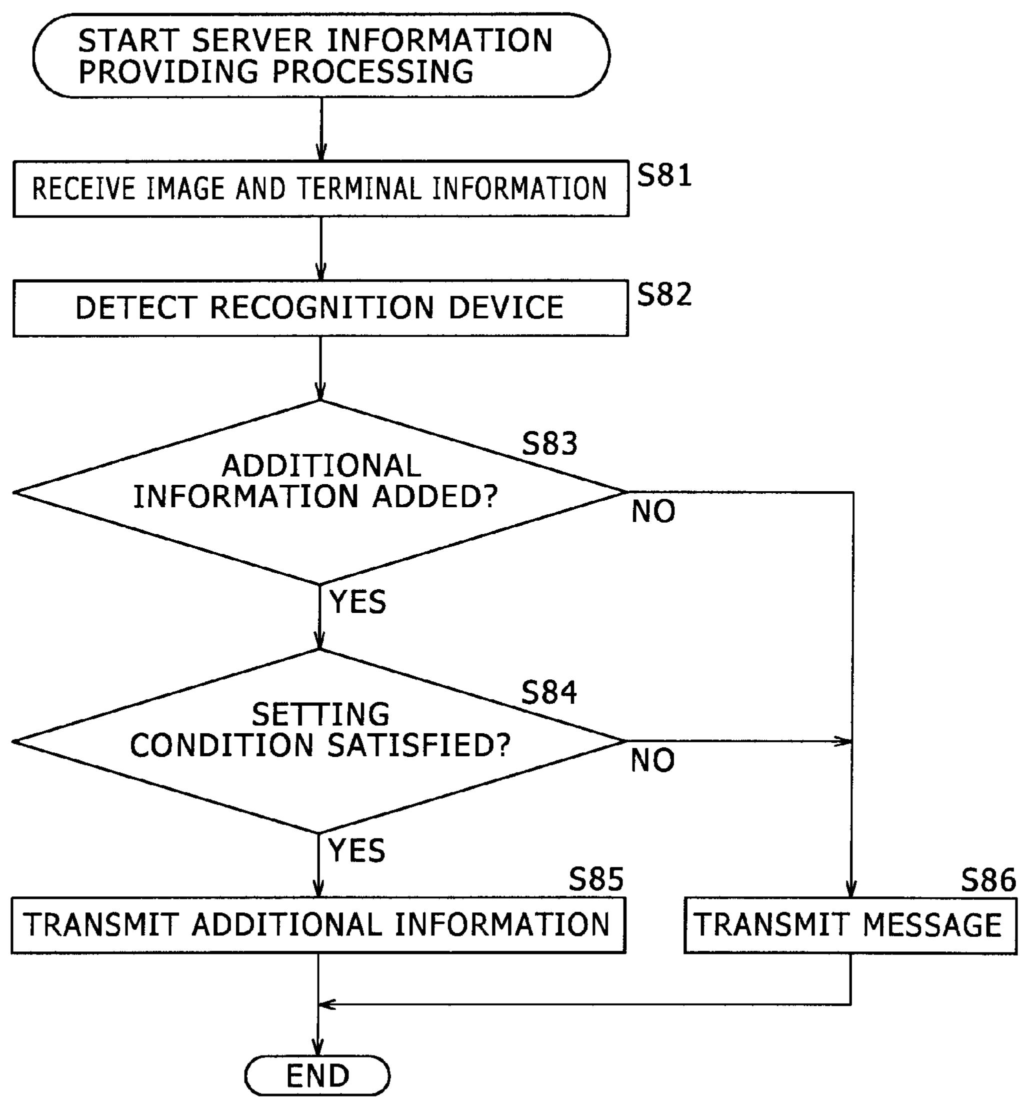
[FIG. 13] A flowchart indicative of one example of information providing processing of the server.

The following describes the processing to be executed on the server 11 in correspondence with the processing of the terminal apparatus 12-1 shown in FIG. 12 with reference to FIG. 13. FIG. 13 is a flowchart indicative of one example of the information providing processing of the server 11.

In step S81, the communication block 61 receives an image and terminal information from the transmission/reception device 42. These items of information are those transmitted from the terminal apparatus 12-1 at location B in step S64 shown in FIG. 12.

In step S82, the detection block 62 supplies the received image and terminal information to the recognition device 21 to detect the recognition device 21 to which the category of the target object 122-2 corresponds. Namely, the category is recognized.

In step S83, the decision block 64 determines whether the additional information 123 has been registered in the information DB 22 in correspondence with the recognition device 21 (the recognized category) detected in step S82.

If the additional information 123 is found to have been registered, then the decision block 64 determines whether the setting condition is satisfied in step S84. For example, if the setting condition 128 is set as shown in B of FIG. 5, then the time zone of information provision is "Always," so that the setting condition is always satisfied. Because the period is "one day," the setting condition is satisfied if the user receives information provision within "one day." However, if the user receives information provision in a period exceeding "one day," then the setting condition is not satisfied. Further, the subject of information provision is limited to "in group (GP)." Therefore, if the terminal information received in step S81 is of a terminal belonging to the group preset, the setting condition is satisfied; otherwise the setting condition is not satisfied.

If the setting condition 128 is satisfied, then, in step S85, the communication block 61 reads the additional information 123 registered in the information DB 22 and supplies this additional information to the transmission/reception device 42 to transmit the additional information to the terminal apparatus 12-1. This additional information is displayed on the terminal apparatus 12-1 in step S66 shown in FIG. 12.

If the setting condition 128 is not satisfied, then, in step S86, the communication block 61 supplies a message thereof to the transmission/reception device 42 to transmit the message to the terminal apparatus 12-1. If the additional information is found to have not registered in step S83, then this message is "No information" for example; if the setting condition is found to have not satisfied in step S84, then this message is "Not inside setting condition range" for example. Here, the information providing processing of the server 11 comes to an end.

It should be noted that, if the setting condition range is limited only to a particular user, then that particular user can exclusively use the additional information; if the setting condition range is limited to family or friend, for example, the additional information can be shared between family members or friends.

To be more specific, the sharing of additional information denotes the provision of additional information to the terminal apparatus 12-2 different from the terminal apparatus 12-1 by which additional information has been registered. In this case, if an image and terminal information are received from the terminal apparatus 12-2 in step S81, the server 11 executes similar information providing processing. Namely, in step S84, if the terminal information of the terminal apparatus 12-2 is the terminal information inside a preset range, the setting conditions is determined to be satisfied, the additional information being transmitted to the terminal apparatus 12-2 in step S85.

[Revision of Information]

Figure 14:
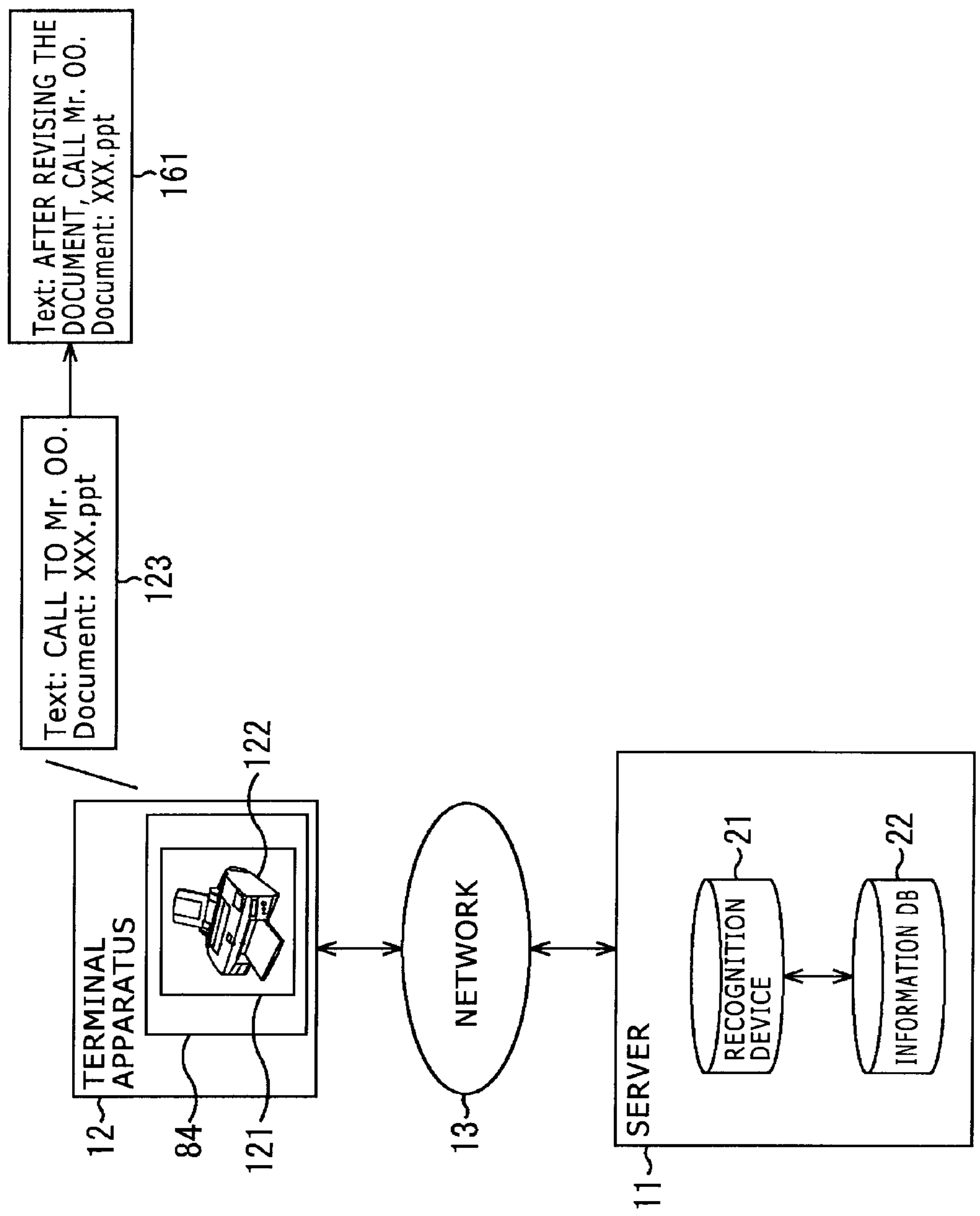
[FIG. 14] A diagram illustrating one example of information revision processing.
Figure 15:
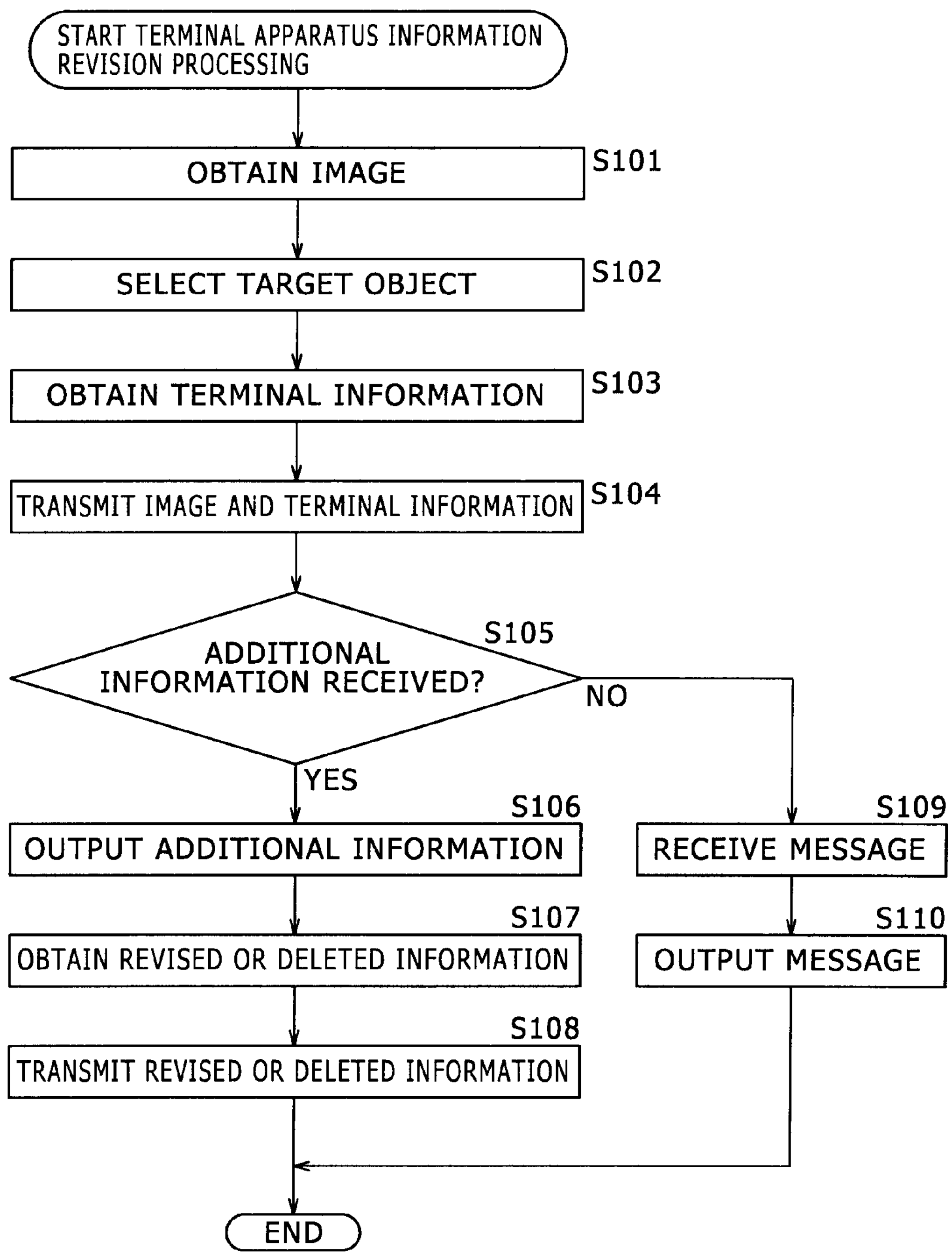
[FIG. 15] A flowchart indicative of one example of information revision processing of the terminal apparatus.
Figure 16:
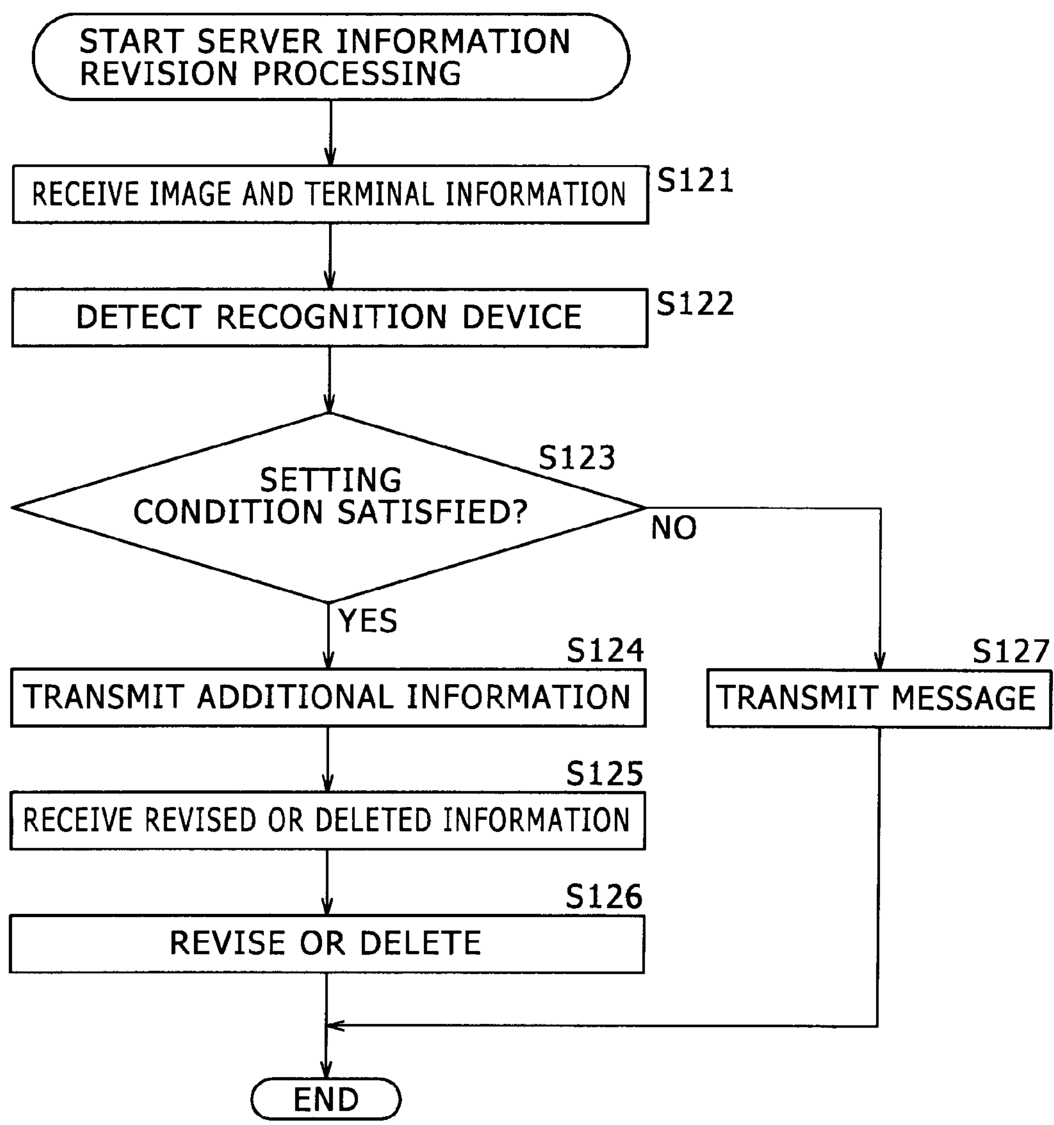
[FIG. 16] A flowchart indicative of one example of information revision processing of the server.

The following describes the processing of revising registered information with reference to FIG. 14 through FIG. 16. FIG. 14 shows one example of information revising processing.

The server 11 transmits the additional information 123 registered in the information DB 22 to the terminal apparatus 12 through the transmission/reception device 42. The terminal apparatus 12 obtains revised or deleted information 161 of the received additional information 123, and transmits the revised or deleted information to the server 11. On the basis of the revised or deleted information 161, the server 11 registers the revision or deletion of the additional information 123.

FIG. 15 is a flowchart indicative of one example of information revising processing of the terminal apparatus 12-1.

When revising registered information, the user takes the target object 122 specified at the time of registration with the camera 82. In step S101, the acquisition block 101 obtains an image taken with the camera 82. This image is outputted to the output apparatus 84 through the output block 104 to be displayed.

Further, in step S102, by operating the input block 83, the user specifies a target area 121 to be recognized from the displayed image. The selection block 102 selects an image of the target area 121 as a target object 122.

In step S103, the acquisition block 101 obtains terminal information stored in the storage block 87 in advance.

In step S104, the communication block 103 supplies the image and terminal information of the target object 122 to the transmission/reception device 85 to transmit the image and terminal information from the antenna 86 to the server 11 via the network 13.

As will be described later with reference to FIG. 16, the server 11 detects the recognition device 21 from the image (step S122 shown in FIG. 16) and, if the setting condition is satisfied, transmits additional information (step S124 shown in FIG. 16). If the setting condition is not satisfied, then the message is transmitted (step S127 shown in FIG. 16).

So, in step S105, the communication block 103 determines whether the transmission/reception device 85 has received the additional information 123 or not.

If the additional information 123 is found to have been received, then, in step S106, the output block 104 supplies the received additional information 123 to the output apparatus 84 for display.

Checking this additional information 123, the user operates the input block 83 to revise or delete a portion to be revised or deleted. In step S107, the acquisition block 101 obtains the revised or deleted information 161.

In step S108, the communication block 103 transmits the revised or deleted information 161 to the transmission/reception device 85 to transmit this information from the antenna 86 to the server 11 via the network 13. As will be described later with reference to FIG. 16, receiving the revised or deleted information 161, the server 11 correspondingly revises or deletes the additional information 123 received so far.

If the additional information 123 has not been received, then, in step S109, the communication block 103 receives a message thereof from the transmission/reception device 85.

In step S110, the output block 104 supplies the received message to the output apparatus 84 for display. Consequently, the user can know that the revision or deletion cannot be done for the reason that the setting condition has not been satisfied or the like.

Here, the information revision processing of the terminal apparatus 12-1 comes to an end.

In response to the above-mentioned processing of the terminal apparatus 12-1, the server 11 executes the processing indicated by the flowchart shown in FIG. 16. FIG. 16 is the flowchart indicative of one example of the information revising processing of the server 11.

In step S121, the communication block 61 receives the image and terminal information from the transmission/reception device 42. These items of information are those transmitted by the terminal apparatus 12-1 in step S104 shown in FIG. 15.

In step S122, the detection block 62 transmits the received image to the recognition device 21 to detect the recognition device 21. Namely, the category of the received image is recognized.

In step S123, the decision block 64 determines whether the setting condition 128 of the recognition device 21 (category) detected in step S122 is satisfied or not. For example, if there is a deviation in time zone or period, it is determined that the setting condition is not satisfied. If the terminal information received in step S121 is not the terminal information inside the group, then it is determined that the setting condition is not satisfied.

If the setting condition is satisfied, then, in step S124, the communication block 61 supplies the additional information 123 stored (namely, of the recognized category) in correspondence with the detected recognition device 21 to the transmission/reception device 42 to transmit the additional information to the terminal apparatus 12-1 via the network 13. As described above, this additional information is displayed on the output apparatus 84 of the terminal apparatus 12-1 in step S106 shown in FIG. 15.

Further, as described above, the revised or deleted information 161 is transmitted from the terminal apparatus 12-1 in step S108 shown in FIG. 15. In step S125, the communication block 61 receives this revised or deleted information 161 from the transmission/reception device 42.

In step S126, the registration block 63 supplies the revised or deleted information 161 to the information DB 22 via the recognition device 21 detected in step S122 to revise or delete the additional information 123 on the basis of the revised or deleted information 161.

If the setting condition is found to be not satisfied in step S123, then, in step S127, the communication block 61 transmits a message thereof to the terminal apparatus 12-1 via the transmission/reception device 42. This message may be "Information cannot be revised or deleted" or the like. This message is received by the terminal apparatus 12-1 in step S109 shown in FIG. 15.

Here, the information revising processing of the server 11 comes to an end.

It should be noted that, when the period specified in the setting condition has passed, the server 11 automatically deletes the corresponding additional information.

<The Second Embodiment>

Figure 17:
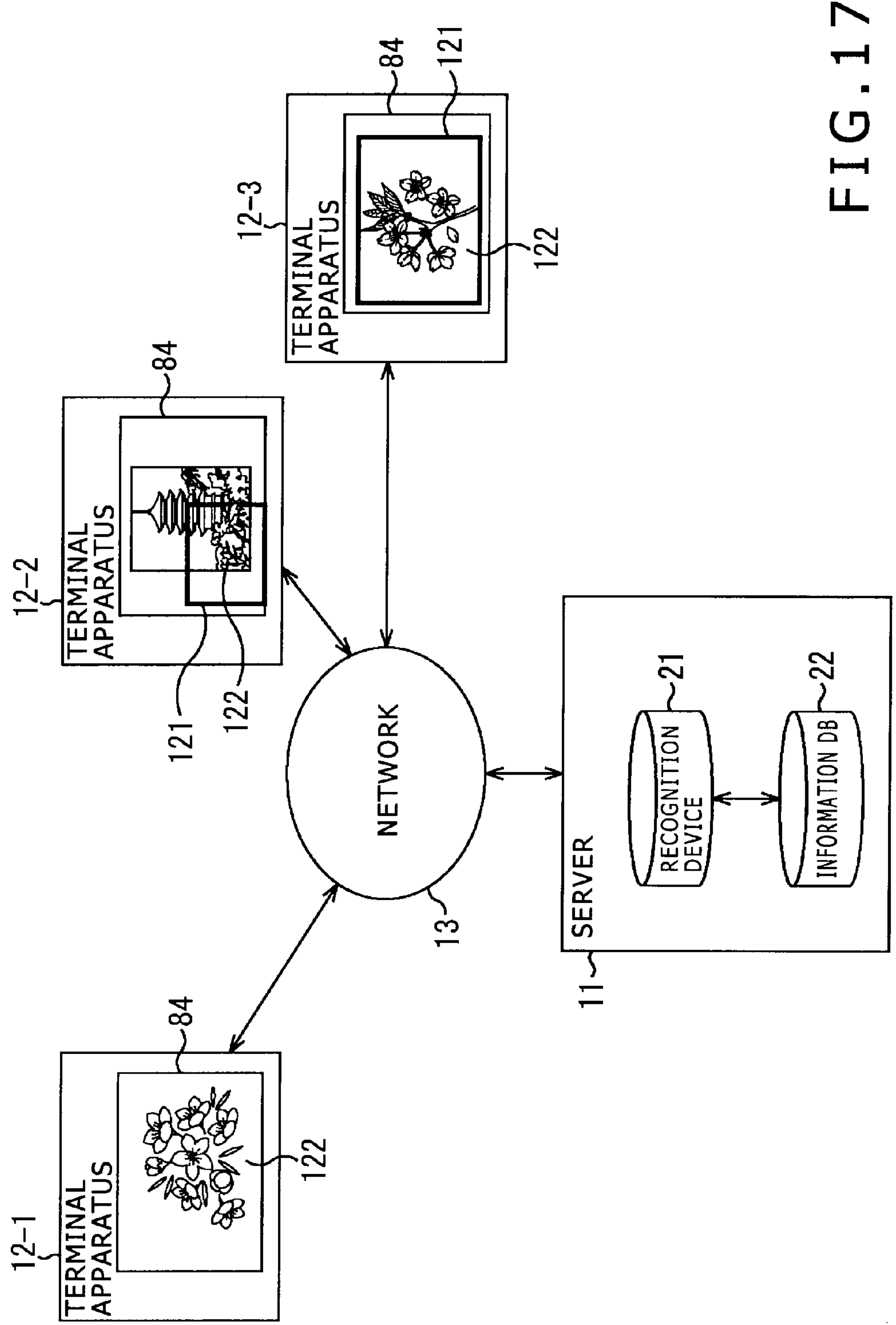
[FIG. 17] A diagram illustrating one example of information acquisition processing.

The following describes the processing to be executed when a user of a terminal apparatus 12-1 receives information obtained by a terminal apparatus 12-2 of another user, namely, when information obtained by the terminal apparatus 12-2 is shared by the terminal apparatus 12-1, with reference to FIG. 17 through FIG. 20. FIG. 17 is a diagram illustrating the information acquisition processing to be executed in this case.

The terminal apparatus 12-1 obtains an image of category "cherry" for example and registers the obtained image into an information DB 22 via a corresponding recognition device 21. If the terminal apparatus 12-2 and a terminal apparatus 12-3 are apparatuses that share information with the terminal apparatus 12-1, then, if the terminal apparatus 12-2 and the terminal apparatus 12-3 take images of the same category "cherry," the taken images are transmitted to the terminal apparatus 12-1.

As described above, the terminal apparatus 12-1 can receive information from other terminal apparatuses such as terminal apparatus 12-2 and so on, so that information can be shared between two or more terminal apparatuses 12.

[Flow of Processing]

Figure 18:
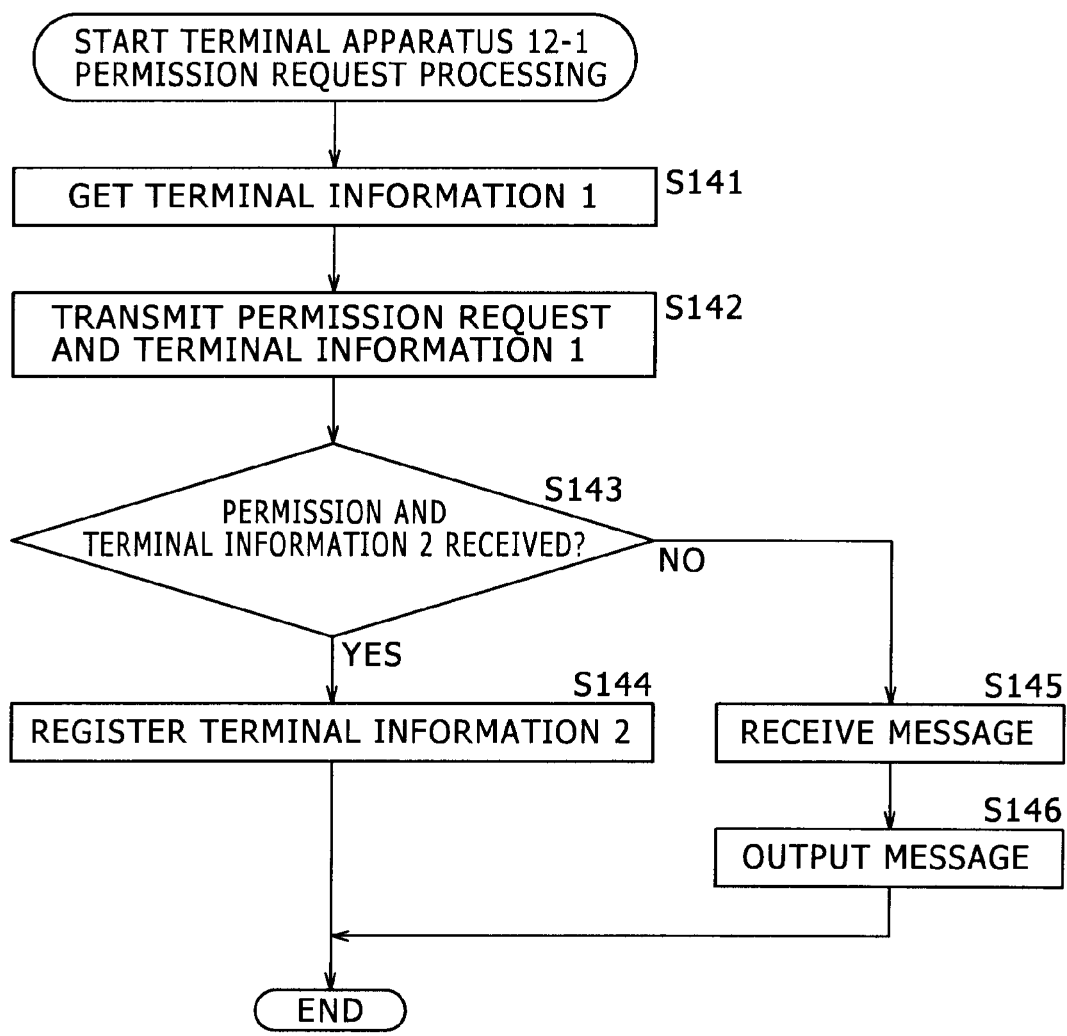
[FIG. 18] A flowchart indicative of one example of permission request processing of the terminal apparatus.

FIG. 18 is a flowchart indicative of one example of permission request processing by the terminal apparatus 12-1. The permission request processing of the terminal apparatus 12-1 is processing that is required in advance if information is shared between the terminal apparatus 12-1 and the other terminal apparatuses 12-2 and 12-3 as shown in the example in FIG. 17. Consequently, the pieces of identification information of information acquisition request source and request destination are registered in each mate apparatus.

When the start of permission request processing is issued by the user, then, in step S141, an acquisition block 101 obtains terminal information 1 stored in a storage block 87 in advance. The terminal information 1 is the ID of the terminal apparatus 12-1, for example.

In step S142, a communication block 103 supplies the information sharing permission request and the terminal information 1 to a transmission/reception device 85 to transmit these items of information from an antenna 86 to the other terminal apparatus 12 via a network 13. If information sharing is executed with the terminal apparatus 12-2, then the destination of transmission is the terminal apparatus 12-2.

As will be described later with reference to FIG. 19, the terminal apparatus 12-2 that has received the permission request transmits permission and terminal information 2 when the terminal apparatus 12-2 permits the request (step S166 shown in FIG. 19). If the request is not permitted, the terminal apparatus 12-2 transmits a message thereof (step S167 shown in FIG. 19). So, in step S143, the communication block 103 determines whether the permission and the terminal information 2 have been received from the transmission/reception device 85. The terminal information 2 is the ID of the terminal apparatus 12-2.

If the permission and terminal information 2 have been received, then, in step S144, a registration block 105 supplies the terminal information 2 to the storage block 87 to register these items of information. Consequently, as will be described later with reference to FIG. 20, information sharing is enabled between the terminal apparatus 12-1 and terminal apparatus 12-2.

If the permission and the terminal information 2 have not been received, then, in step S145, the communication block 103 receives a message thereof from the transmission/reception device 85.

In step S146, an output block 104 supplies the received message to the output apparatus 84 for display. Consequently, the user can know that the information sharing has been rejected by the terminal apparatus 12-2. Here, the permission request processing on the side of the terminal apparatus 12-1 comes to an end.

Figure 19:
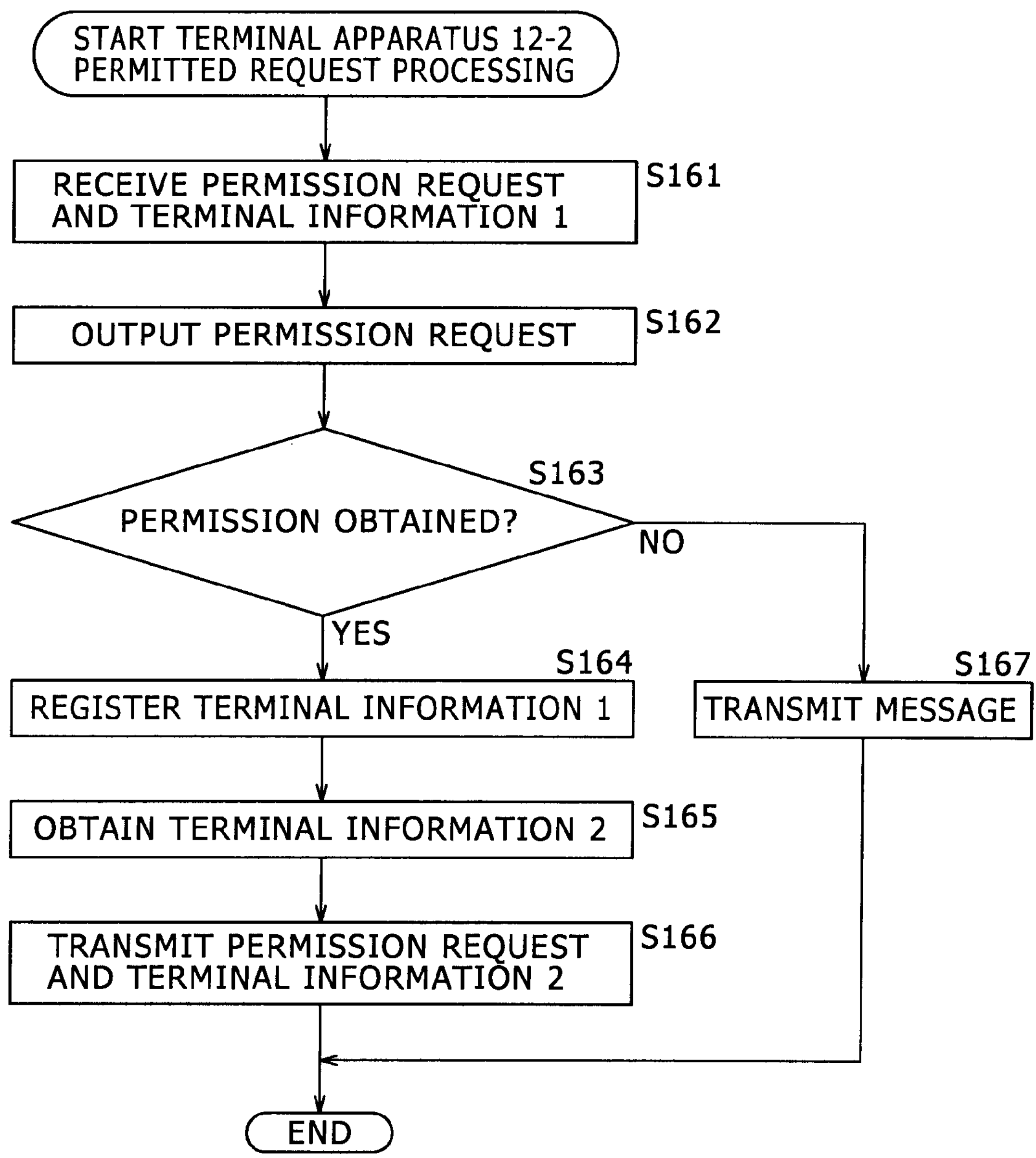
[FIG. 19] A flowchart indicative of one example of permitted request processing of the terminal apparatus.

FIG. 19 is a flowchart indicative of one example of permitted request processing of the terminal apparatus 12-2 that is executed in correspondence with the above-mentioned processing of the terminal apparatus 12-1.

In step S161, a communication block 103 of the terminal apparatus 12-2 receives the permission request and the terminal information 1 from a transmission/reception device 85. These items of information are those transmitted from the terminal apparatus 12-1 in step S142 shown in FIG. 18.

In step S162, the output block 104 supplies the permission request to the output apparatus 84 for display.

Checking this display, the user of the terminal apparatus 12-2 operates an input block 83 to enter permission or rejection of the request transmitted from the terminal apparatus 12-1. In response to this operation, a decision block 106 determines whether permission has been obtained or not in step S163.

If permission has been obtained, namely, if the request has been permitted by the user, then, in step S164, a registration block 105 supplies the terminal information 1 received in step S161 to the storage block 87 for registration.

In step S165, an acquisition block 101 obtains terminal information 2 stored in the storage block 87 in advance. The terminal information 2 is the ID of the terminal apparatus 12-2 for example.

In step S166, the communication block 103 supplies the information sharing permission and the terminal information 2 to the transmission/reception device 85 to transmit these items of information from an antenna 86 to the terminal apparatus 12-1 via the network 13. These items of information are received by the terminal apparatus 12-1 in step S143 shown in FIG. 18 and registered in step S144.

If it is determined that information sharing permission has not been obtained in step S163, namely, that information sharing permission has been rejected, then, in step S167, the communication block 103 supplies a message thereof to the transmission/reception device 85 to transmit this message from the antenna 86 to the terminal apparatus 12-1 via the network 13. This message may be "Not permitted" for example. Here, the permitted request processing of the terminal apparatus 12-2 comes to an end.

It should be noted that the permission request processing of the terminal apparatus 12-1 has been described above such that this processing is executed in advance; however, it is also practicable to execute this processing when actually requesting the transmission of shared information.

If the information is shared also with the terminal apparatus 12-3, the user of the terminal apparatus 12-1 is required to execute the same processing as executed on the terminal apparatus 12-2 described above also with the terminal apparatus 12-3. The sharing of information cannot be realized with any terminal apparatus on which this processing has not been executed.

As described above, after completing the preprocessing of information sharing executed on the terminal apparatus 12-2, the terminal apparatus 12-1 requests, with a given timing, the terminal apparatus 12-2 to transmit the information to be shared. The following describes the processing in this case with reference to FIG. 20.

Figure 20:
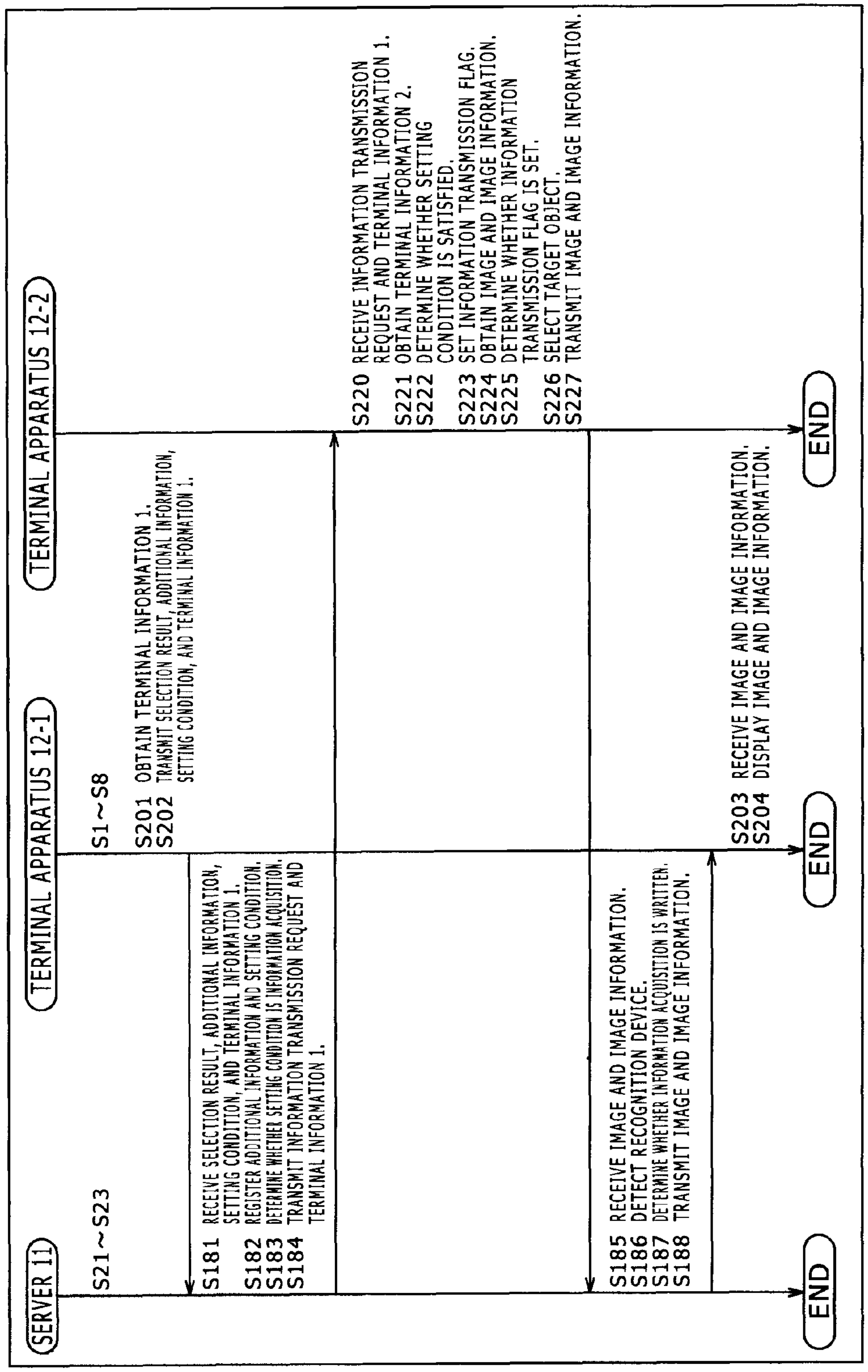
[FIG. 20] A flowchart indicative of one example of a relationship of mutual processing between the server and two terminal apparatuses.

FIG. 20 is flowcharts indicative of one example of a relationship of mutual processing between the server 11 and the terminal apparatuses 12-1 and 12-2 (if N=2).

FIG. 20 shows a flowchart indicative of one example of information providing processing of the server 11, a flowchart indicative of one example of information acquisition processing of the terminal apparatus 12-1, and a flowchart indicative of one example of information transmission processing of the terminal apparatus 12-2, from left to right. It should be noted that the arrows linking these flowcharts are indicative of the directions in which information flows.

Although detail explanation is skipped, in FIG. 20, the same processing as that of steps S21 through S23 of the information registration processing shown in FIG. 7 is executed before step S181 of the server 11. Also, before the processing of step S201 of the terminal apparatus 12-1, the same processing as that of steps S1 through S8 of the information registration processing shown in FIG. 6 is executed.

To be more specific, in step S1, the acquisition block 101 of the terminal apparatus 12-1 obtains an image taken by the user with the camera 82. In step S2, the selection block 102 of the terminal apparatus 12-1 selects, as a target object 122, the image in which the user selected a target area 121.

In step S3, the acquisition block 101 of the terminal apparatus 12-1 obtains the additional information 123 entered by the user through the input block 83. In step S4, the communication block 103 of the terminal apparatus 12-1 supplies the image of the target object 122 selected in step S2 to the transmission/reception device 85 to transmit this image to the server 11.

In step S21, the communication block 61 of the server 11 receives the image transmitted from the terminal apparatus 12-1. In step S22, the detection block 62 of the server 11 supplies the image received in step S21 to the recognition device 21 to detect candidates of the recognition device 21.

In step S23, the communication block 61 of the server 11 supplies a recognition device list 124 of the detected candidates of the recognition device 21 and a representative image list 126 to the transmission/reception device 42 to transmit these lists to the terminal apparatus 12-1.

In step S5, the communication block 103 of the terminal apparatus 12-1 receives the recognition device list 124 and the representative image list 126. In step S6, the output block 104 of the terminal apparatus 12-1 supplies the recognition device list 124 and the representative image list 126 to the output apparatus 84 for display.

In step S7, the selection block 102 of the terminal apparatus 12-1 selects recognition device name 125-*i* and representative image 127-*i* selected by the user. In step S8, the acquisition block 101 of the terminal apparatus 12-1 obtains the setting condition 128 entered by the user through the input block 83.

After the above-mentioned processing, the processing of steps S201 through S204 of the terminal apparatus 12-1, the processing of steps S181 through S188 of the server 11, and the processing of steps S220 through S227 of the terminal apparatus 12-2 are executed as described below.

Namely, in step S201, the acquisition block 101 of the terminal apparatus 12-1 obtains terminal information 1 that is terminal information of the terminal apparatus 12-1.

In step S202, the communication block 103 of the terminal apparatus 12-1 supplies a selection result of the recognition device 21 (step S7 shown in FIG. 6), the additional information 123 (step S3 shown in FIG. 6), the setting condition 128 (step S8 shown in FIG. 6), and the terminal information 1 (step S201), to the transmission/reception device 85 to transmit these items of information from the antenna 86 to the server 11 via the network 13.

In step S181, the communication block 61 of the server 11 receives the selection result, the additional information 123, the setting condition 128, and the terminal information 1 from the transmission/reception device 42.

In step S182, the registration block 63 supplies the additional information 123 and the setting condition 128 to information DB 22 (selected category) corresponding to the selected recognition device 21 for registration.

In step S183, the decision block 64 determines whether information acquisition is set as the setting condition 128 or not. If information presentation is set in association with the function of information presentation/acquisition of the setting condition 128, then the processing to be executed is the same as that shown in FIG. 6, so that the processing shown in FIG. 20 comes to an end.

If information acquisition is set, then, in step S184, the communication block 61 supplies an information transmission request and the terminal information 1 to the transmission/reception device 42 to transmit these items of information to the terminal apparatus 12-2 that is the mate of the transmission of shared information via the network 13. The information transmission request is used to request the terminal apparatus 12-2 to transmit the obtained image and image information. The image information is indicative of a time and a place at which the image was taken, for example.

In step S220, the communication block 103 of the terminal apparatus 12-2 receives, from the transmission/reception device 85, the information transmission request and terminal information 1 transmitted from the server 11.

In step S221, the acquisition block 101 obtains terminal information 2 that is terminal information of the terminal apparatus 12-2 from the storage block 87.

In step S222, the decision block 106 determines whether the setting condition is satisfied or not. If the setting condition is found to be not satisfied, then the communication block 103 supplies a message "Acquisition of image not permitted" for example to the transmission/reception device 85 to transmit this message from the antenna 86 to the server 11 via the network 13. The server 11 further transmits this message to the terminal apparatus 12-1.

If the setting condition is found to be satisfied, then, in step S223, the registration block 105 registers an information transmission flag.

When the information transmission flag is set as described above, the information to be obtained by the terminal apparatus 12-2 becomes ready for transmission to the terminal apparatus 12-1.

In step S224, when the user of the terminal apparatus 12-2 takes an image of a subject with the camera 82, the acquisition block 101 obtains the taken image and image information. The image information denotes the date and time, and location at which the image was taken, a comment, and other information associated with the taken image.

In step S225, the decision block 106 determines whether the information transmission flag has been registered or not. If the information transmission flag is found to have not been registered, then the information transmission processing of the terminal apparatus 12-2 comes to an end. Namely, in this case, because the sharing of information is not permitted, the image obtained by the terminal apparatus 12-2 is not transmitted to the terminal apparatus 12-1.

If the information transmission flag is found to have been registered, when the user specifies a target area 121 of the image displayed on the output apparatus 84 by operating the input block 83, the selection block 102 selects a target object 122 in the target area 121 in step S226.

In step S227, the communication block 103 supplies the image and image information obtained in step S224 to the transmission/reception device 85 to transmit the image and the image information from the antenna 86 to the server 11 via the network 13. Namely, the image taken by the terminal apparatus 12-2 is transmitted as an image to be shared.

The processing operations of steps S224 through S227 are repetitively executed every time an image is taken while the information transmission flag is registered. When the permission is cancelled, the registration block 105 deletes the information transmission flag in the storage block 87.

In step S185, the communication block 61 of the server 11 receives, from the transmission/reception device 42, the image and the image information transmitted from the terminal apparatus 12-2.

In step S186, the detection block 62 supplies the received image to the recognition device 21 to detect a recognition device 21 corresponding to the image. Namely, a category of the image is recognized.

In step S187, the decision block 64 determines whether information acquisition is written to the setting condition 128 of the recognition device 21 of the terminal apparatus 12-1 corresponding to the category of the recognition device 21 detected in step S186. The setting condition 128 of the terminal apparatus 12-1 has already been registered by the processing of step S182. If information acquisition is not written as the setting condition 128, then the information acquisition processing of the server 11 comes to an end.

If information acquisition is found to have been written, then, in step S188, the communication block 61 supplies the image and the image information received from the terminal apparatus 12-2 in step S185 to the transmission/reception device 42 to transmit the image and the image information to the terminal apparatus 12-1 via the network 13. Here, the information acquisition processing of the server 11 comes to an end.

In step S203, the communication block 103 of the terminal apparatus 12-1 receives, from the transmission/reception device 85, the image and the image information transmitted from the terminal apparatus 12-2 via the server 11.

In step S204, the output block 104 supplies the received image and image information to the output apparatus 84 for display. Here, the information acquisition processing of the terminal apparatus 12-1 comes to an end.

As described above, sharing the recognition device 21 between two or more users allows the terminal apparatus 12-1 to obtain the information of the same category as the category ("cherry" in the example shown in FIG. 17 for example) of the information such as an image registered in the server 11 from the terminal apparatus 12-2 for example permitted to acquire information. Namely, the terminal apparatus 12-1 can share information associated with "cherry" with other terminal apparatuses such as the terminal apparatus 12-2. In addition, the information of other persons that cannot be searched by Web search can be obtained by the above-mentioned information acquisition processing.

<The Third Embodiment>

Figure 21:
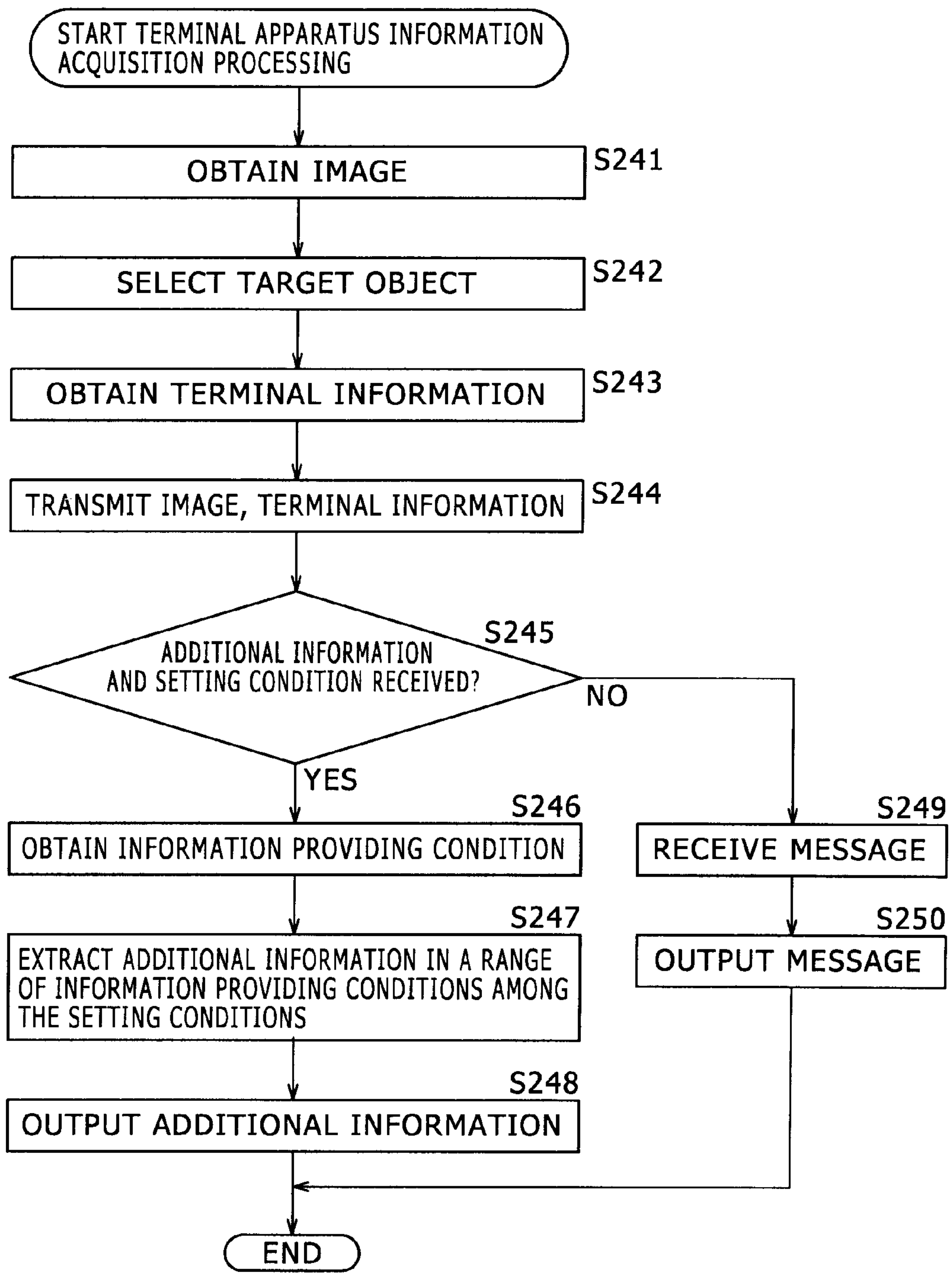
[FIG. 21] A flowchart indicative of one example of information acquisition processing of the terminal apparatus.
Figure 22:
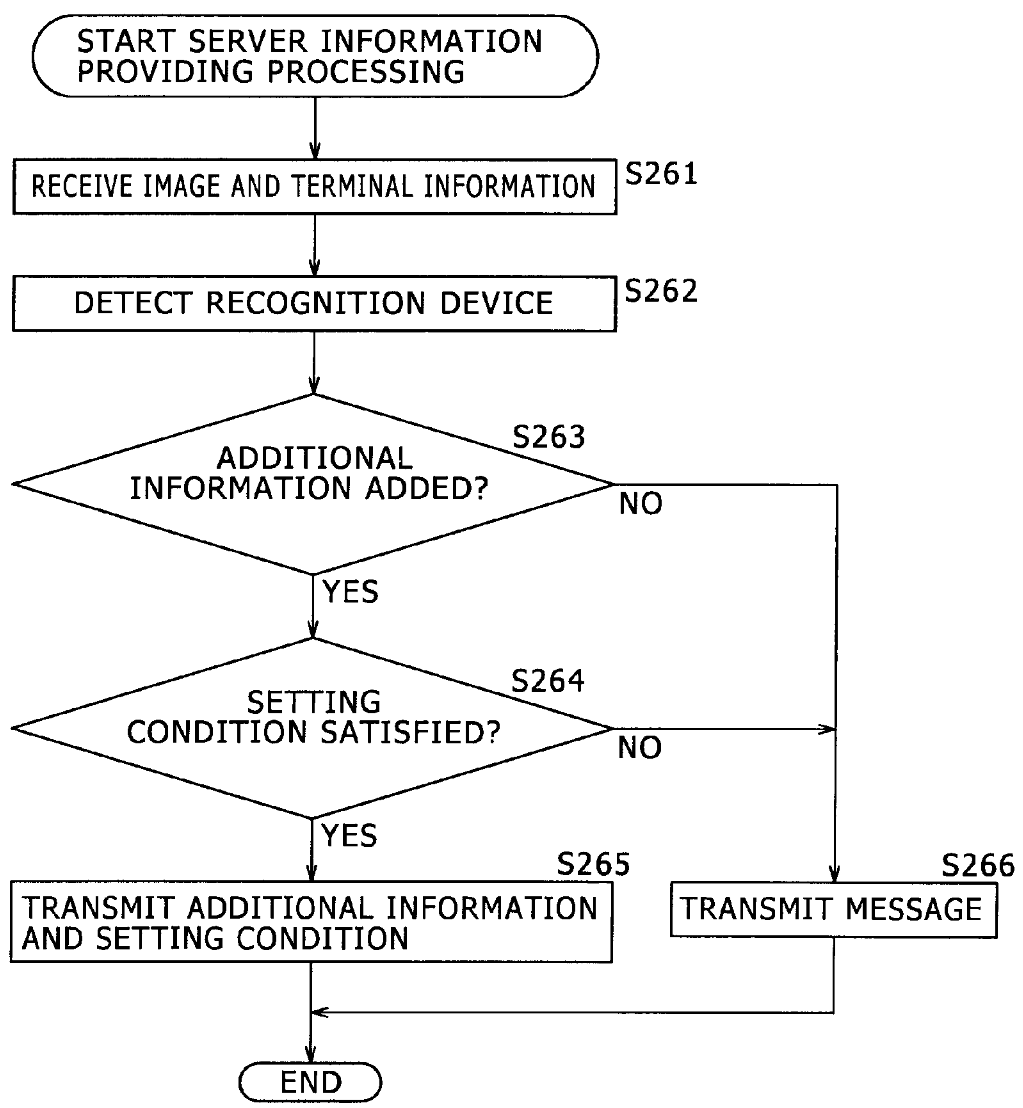
[FIG. 22] A flowchart indicative of one example of information providing processing of the server.

The following describes the processing of providing information registered in advance in the server 11 by an business entity to a user associated with this business entity with reference to FIG. 21 and FIG. 22.

[Flow of the Processing]

FIG. 21 shows a flowchart indicative of one example of information acquisition processing of the terminal apparatus 12.

The user takes, with a camera 82, an image of a subject at a predetermined location about which the user wants to obtain the provision of associated information. In step S241, an acquisition block 101 obtains the image taken with the camera 82. This image is displayed on an output apparatus 84.

The user specifies a target area 121 to be recognized from the obtained image by operating an input block 83. In step S242, a selection block 102 selects an image in the target area 121 as a target object 122.

In step S243, the acquisition block 101 obtains terminal information for identifying the terminal apparatus 12. This terminal information is stored in a storage block 87 in advance.

In step S244, a communication block 103 supplies the image of the target object 122 and the terminal information to a transmission/reception device 85 to transmit the image and the terminal information from an antenna 86 to the server 11 via a network 13.

As will be described later with reference to FIG. 22, if additional information is registered in the image and a setting condition is satisfied, the server 11 that has received the image and the terminal information transmits the additional information and the setting condition (step S265 shown in FIG. 22). Otherwise, the server 11 transmits a message thereof (step S266 shown in FIG. 22).

Therefore, in step S245, a decision block 106 determines whether the transmission/reception device 85 has received the additional information 123 and the setting condition 128.

If the additional information 123 and the setting condition 128 are found to have been received, then, in step S246, the acquisition block 101 obtains an information output condition from the terminal apparatus 12. The information output condition denotes a condition necessary for the user to receive the provision of information such as user profile information including the ID of the terminal apparatus 12 for example and positional information for example, and output (display in this embodiment) these items of information.

In step S247, the acquisition block 101 extracts the additional information inside the range of information output condition in the setting condition. Writing details such as gender, age, language, and interest as profile information allows the extraction of different items of additional information. In addition, depending on locations, different items of additional information can be extracted. Namely, the information to be extracted can be personalized.

In step S248, the output block 104 supplies the received additional information 123 to the output apparatus 84 to output the additional information in video and audio. Consequently, the user can receive the provision of information. It should be noted that additional information can be displayed as superimposed on the image taken with the camera 82.

If the additional information and the setting condition are found to have not been received in step S245, then, in step S249, the communication block 103 receives a message thereof from the transmission/reception device 85. This message is transmitted from the server 11 in step S266 shown in FIG. 22 to be described later.

In step S250, the output block 104 supplies the received message to the output apparatus 84 to output the message in video or audio. Consequently, from a message "No information" or "Not in range of setting condition" for example, the user understands the reason why the provision of information cannot be obtained. Here, the information acquisition processing of the terminal apparatus 12 comes to an end.

In correspondence with the processing of the terminal apparatus 12 described above, the server 11 executes the processing shown in FIG. 22. FIG. 22 is a flowchart indicative of one example of the information providing processing of the server 11.

In step S261, the communication block 61 receives, from the transmission/reception device 42, the image and the terminal information transmitted by the terminal apparatus 12 in step S244 shown in FIG. 21.

In step S262, the detection block 62 supplies the received image to the recognition device 21 to detect a corresponding recognition device 21. Namely, the category of the image is recognized.

In step S263, the decision block 64 determines whether the additional information has been registered in correspondence with the recognition device 21 detected in step S262.

If the additional information found to have been registered, then, in step S264, the decision block 64 determines, on the basis of the terminal information received in step S261 and the setting condition of the recognition device 21 detected in step S262, whether the setting condition is satisfied or not. In the case of the present embodiment, if the terminal information is inside the range of setting condition, it is determined that the setting condition is satisfied.

If the terminal information is inside the range of setting condition, then, in step S265, the communication block 61 supplies the additional information and the setting condition to the transmission/reception device 42 to transmit the additional information and the setting condition to the terminal apparatus 12 via the network 13. These items of information are received by the terminal apparatus 12 in step S245 shown in FIG. 21.

It is also practicable to receive an information provision condition from the terminal apparatus 12, extract a condition inside the range of information output condition of the setting conditions by the server 11, and transmit the additional information inside this range to the terminal apparatus 12.

In step S266, the communication block 61 supplies a message to the transmission/reception device 42 to transmit the message to the terminal apparatus 12 via the network 13. This message is “No information” for example if the additional information is found to have not been registered in step S263. If the setting condition is found to be satisfied in step S264, this message is “Not inside the range of setting condition” for example. These massages are received by the terminal apparatus 12 in step S249 shown in FIG. 21.

Here, the terminal information setting processing of the server 11 comes to an end.

As described above, the terminal apparatus 12 is capable of setting information presented based on user profile information such as the ID set in the terminal apparatus 12 and the positional information of the terminal apparatus 12, so that only the desired information can be presented.

It should be noted that the recognition device 21 and the information DB 22 can be arranged on the server 11 as described above or on the terminal apparatus 12 such that the function of the server 11 is included in the terminal apparatus 12.

In this case, the registration processing shown in FIG. 6 and FIG. 7, the information acquisition processing shown in FIG. 12, and information providing processing shown in FIG. 13 are all executed in the terminal apparatus 12. At this moment, because these processing operations are executed in the same apparatus, the confirmation of terminal information is not required. In addition, the output apparatus 84 functions as output means for outputting registration information.

Figure 23:
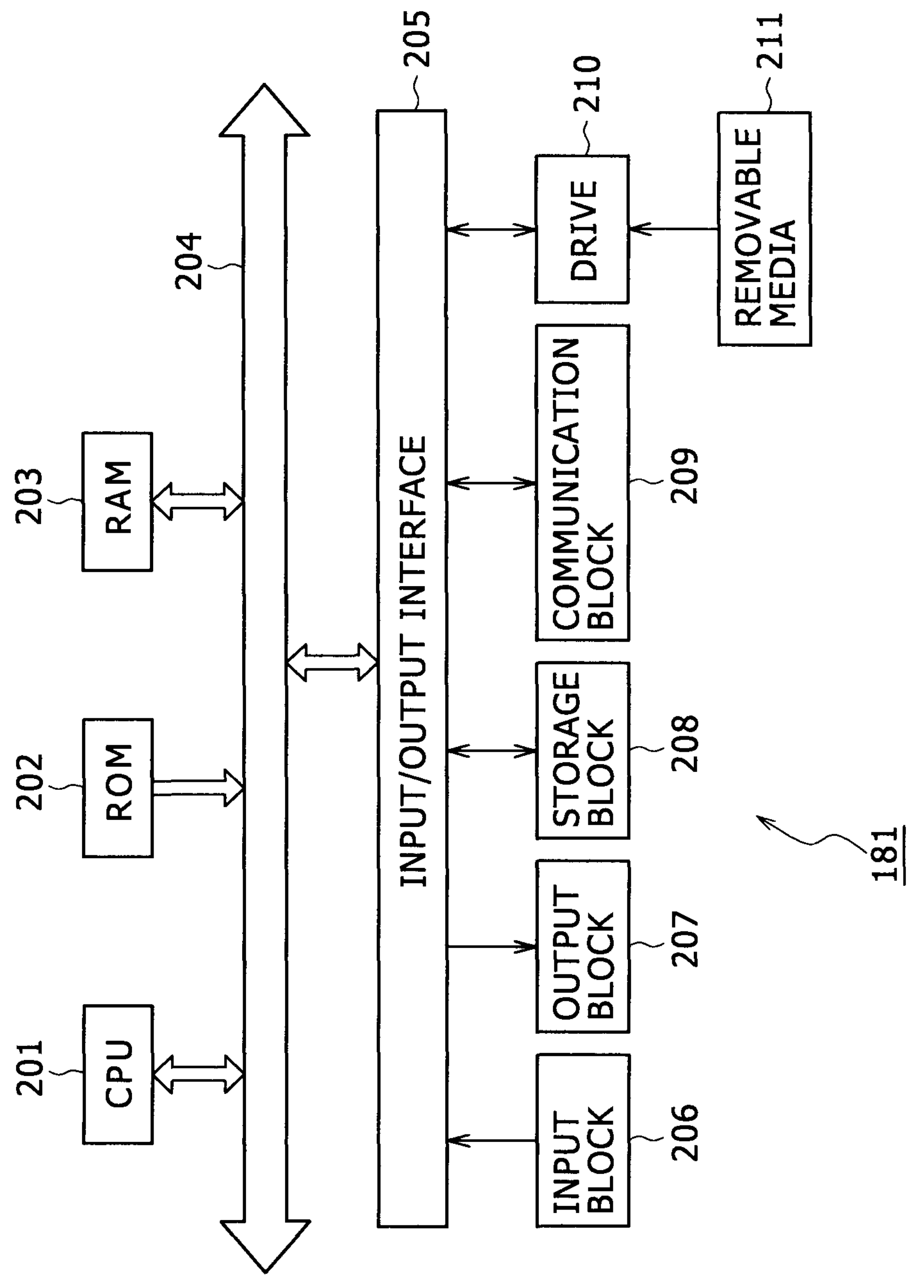
[FIG. 23] A block diagram illustrating an exemplary hardware configuration of a computer to which the present invention is applied.

FIG. 23 is a block diagram illustrating an exemplary hardware configuration of hardware 181 of a computer that executes the above-mentioned sequence of processing operations by programs.

In the computer 181, a CPU 201, a ROM (Read Only Memory) 202, and a RAM (Random Access Memory) 203 are interconnected by a bus 204. The bus 204 is further connected to an input/output interface 205. The input/output interface 205 is connected to an input block 206 including a keyboard, a mouse, and a microphone, an output block 207 including an output apparatus and a speaker, and a storage block 208 including a hard disk or a nonvolatile memory. Further, the input/output interface 205 is connected to a communication block 209 including a network interface and a drive 210 for driving a removable medium 211 such as a magnetic disk, an optical disk, a magneto-optical disk, or a semiconductor memory.

In the computer configured as described above, the CPU 201 loads a program stored in the storage block into the RAM 203 via the input/output interface 205 and the bus 204 for execution, thereby executing the above-mentioned sequence of processing operations. The program to be executed by the computer 181 (the CPU 201) is provided as recorded to the removable medium 211 that is a magnetic disk (including a flexible disk) for example. The program is provided as recorded to the removable medium 211 that is a package medium. It should be noted that, for the package medium, an optical disk (CD-ROM (Compact Disc-Read Only Memory), DVD (Digital Versatile Disc), and the like), a magneto-optical disk, or a semiconductor memory is used. Alternatively, a program is provided via wired or wireless transmission media, such as a local area network, the Internet, or digital satellite broadcasting. By loading the removable medium 211 on the drive 210, the program can be installed in the storage block 208 via the input/output interface 205. Also, the program can be received by the communication block 209 via wired or wireless transmission media and installed in the storage block 208. Further, the program can be received by a communication block 309 via wired or wireless transmission media and installed in the storage block 208. Still further, the program can be installed in the ROM 202 or the storage block 208 in advance.

It should be noted that the programs to be executed by the computer may be executed in a time-dependent manner in the sequences described in the present description or in parallel or on an on-demand basis, such as when the program is called.

It should also be noted that term system as used in the present description denotes an entire apparatus configured by a plurality of component units and means.

It is to be understood that preferred embodiments of the present invention are not limited to the embodiments described above, and various modifications may be made without departing from the spirit or scope of the present invention.

EXPLANATION OF REFERENCE SYMBOLS

11 . . . Server, 12 . . . Terminal apparatus, 21 . . . Recognition device, 22 . . . Information DB, 42 . . . Transmission/reception device, 61 . . . Communication block, 62 . . . Detection block, 63 . . . Registration block, 64 . . . Decision block, 84 . . . Output apparatus, 85 . . . Transmission/Reception device, 87 . . . Storage block, 101 . . . Acquisition block, 102 . . . Selection block, 103 . . . Communication block, 104 . . . Output block, 105 . . . Registration block

The invention claimed is:

1. An information providing apparatus comprising:

a storage configured to store registration information as related with a category;

recognition means configured to recognize said category corresponding to acquisition information acquired from a terminal apparatus; and communication means configured to transmit said registration information corresponding to said category of said acquisition information recognized by said recognition means to said terminal apparatus, wherein said communication means receives first acquisition information that is said acquisition information from a first terminal apparatus, said recognition means recognizes a plurality of categories for said first acquisition information acquired from said first terminal apparatus, said communication means transmits the plurality of categories to said first terminal apparatus and receives a predetermined category selected from the plurality of categories by said first terminal apparatus and said registration information related therewith, said storage stores said received registration information as related with said selected predetermined category, said communication means receives second acquisition information that is said acquisition information from a second terminal apparatus and terminal information, said recognition means further recognizes a second category that is said category of said second acquisition information acquired from said second terminal apparatus, and if said second category further recognized by said recognition means corresponds to said predetermined category and a setting condition in said registration information corresponding to said predetermined category is satisfied, said communication means transmits said registration information to said second terminal apparatus.

2. The information providing apparatus according to claim 1, wherein said first terminal apparatus and said second terminal apparatus are equal to each other.

3. The information providing apparatus according to claim 2, wherein said communication means further receives revision information from said terminal apparatus, and said storage revises said registration information on the basis of said revision information.

4. An information providing method for an information providing apparatus having a storage configured to store registration information as related with a category, recognition means configured to recognize said category corresponding to acquisition information acquired from a terminal apparatus, and communication means configured to transmit said registration information corresponding to said category of said acquisition information recognized by said recognition means to said terminal apparatus, said information providing method comprising the steps of:

receiving, by said communication means, first acquisition information that is said acquisition information from a first terminal apparatus;

recognizing, by said recognition means, a plurality of categories for said first acquisition information acquired from said first terminal apparatus;

transmitting, by said communication means, the plurality of categories to said first terminal apparatus and receiving a predetermined category selected from the plurality of categories by said first terminal apparatus and said registration information related therewith;

storing, by said storage, said received registration information as related with said selected predetermined category;

receiving, by said communication means, second acquisition information that is said acquisition information from a second terminal apparatus and terminal information;

further recognizing, by said recognition means, a second category that is said category of said second acquisition information acquired from said second terminal apparatus; and if said second category further recognized by said recognition means corresponds to said predetermined category and a setting condition in said registration information corresponding to said predetermined category is satisfied, transmitting, by said communication means, said registration information to said second terminal apparatus.

5. A non-transitory medium including instructions, executable by a processor in a computer, for causing the computer to:

store registration information as related with a category, recognize said category corresponding to acquisition information acquired from a terminal apparatus, and transmit said registration information corresponding to said category of said acquisition information to said terminal apparatus, wherein the computer is further caused to:

receive first acquisition information that is said acquisition information from a first terminal apparatus, recognize a plurality of categories for said first acquisition information acquired from said first terminal apparatus, transmit the plurality of categories to said first terminal apparatus and receive a predetermined category selected from the plurality of categories by said first terminal apparatus and said registration information related therewith, store said received registration information as related with said selected predetermined category, receive second acquisition information that is said acquisition information from a second terminal apparatus and terminal information, recognize a second category that is said category of said second acquisition information acquired from said second terminal apparatus, and if said second category corresponds to said predetermined category and a setting condition in said registration information corresponding to said predetermined category is satisfied, transmit said registration information to said second terminal apparatus.

6. An information providing apparatus comprising:

recognition means configured to recognize a category corresponding to acquisition information acquired from a terminal apparatus; and a storage configured to store registration information received from said terminal apparatus by communication means as related with said category, wherein said communication means receives first acquisition information that is said acquisition information from a first terminal apparatus, said recognition means recognizes a plurality of categories for said first acquisition information acquired from said first terminal apparatus, said communication means transmits the plurality of categories to said first terminal apparatus and receives a first category selected from the plurality of categories by said first terminal apparatus and first registration information that is said registration information related therewith, said storage stores said first registration information as related with said selected first category, said communication means transmits, to a second terminal apparatus, terminal information of said first terminal apparatus in said first registration information and an information transmission request for transmitting second acquisition information that is said acquisition information acquired by said second terminal apparatus and receives said second acquisition information from said second terminal apparatus, said recognition means recognizes a second category that is said category corresponding to said second acquisition information, and said communication means, if said second category corresponds to said first category, transmits said second acquisition information to said first terminal apparatus.

7. An information providing method for an information providing apparatus having recognition means configured to recognize a category corresponding to acquisition information acquired from a terminal apparatus, communication means configured to communicate with said terminal apparatus, and a storage configured to store registration information received from said terminal apparatus by said communication means as related with said category, said information providing method comprising the steps of:

receiving, by said communication means, first acquisition information that is said acquisition information from a first terminal apparatus, recognizing, by said recognition means, a plurality of categories for said first acquisition information acquired from said first terminal apparatus, transmitting, by said communication means, the plurality of categories to said first terminal apparatus and receiving a first category selected from the plurality of categories by said first terminal apparatus and first registration information that is said registration information related therewith, storing, by said storage, said first registration information as related with said selected first category, transmitting, by said communication means, to a second terminal apparatus, terminal information of said first terminal apparatus in said first registration information and an information transmission request for transmitting second acquisition information that is said acquisition information acquired by said second terminal apparatus and receiving said second acquisition information from said second terminal apparatus, recognizing, by said recognition means, a second category that is said category corresponding to said second acquisition information, and if said second category corresponds to said first category, transmitting, by said communication means, said second acquisition information to said first terminal apparatus.

8. A non-transitory medium including instructions, executable by a processor in a computer, for causing the computer to:

recognize a category corresponding to acquisition information acquired from a terminal apparatus, communicate with said terminal apparatus, and store registration information received from said terminal apparatus by said communication means as related with said category, wherein the computer is further caused to:

receive first acquisition information that is said acquisition information from a first terminal apparatus, recognize a plurality of categories for said first acquisition information acquired from said first terminal apparatus, transmit the plurality of categories to said first terminal apparatus and receive a first category selected from the plurality of categories by said first terminal apparatus and first registration information that is said registration information related therewith, store said first registration information as related with said selected first category, transmit, to said second terminal apparatus, terminal information of said first terminal apparatus in said first registration information and an information transmission request for transmitting second acquisition information that is said acquisition information acquired by said second terminal apparatus and receive said second acquisition information from said second terminal apparatus, recognize a second category that is said category corresponding to said second acquisition information, and if said second category corresponds to said first category, transmit said second acquisition information to said first terminal apparatus.

9. A terminal apparatus comprising:

acquisition means configured to acquire acquisition information and registration information;

a storage configured to store the acquisition information and the registration information;

communication means configured to communicate with an information providing apparatus; and selection means configured to select a received category from said information providing apparatus, wherein said communication means transmits first acquisition information that is said acquisition information to said information providing apparatus and receives a plurality of categories for said first acquisition information from said information providing apparatus, said selection means selects a first category from the received plurality of categories, said acquisition means acquires said registration information related with said selected first category, and said communication means transmits said selected first category and said registration information related therewith to said information providing apparatus, after storing said first category and said registration information therein, transmits second acquisition information that is said acquisition information to said information providing apparatus, and, if a second category that is said category of said second acquisition information corresponds to said first category, receives said registration information from said information providing apparatus.

10. The terminal apparatus according to claim 9, further comprising:

output condition acquisition means configured to acquire an output condition for outputting said registration information received from said information providing apparatus;

decision means configured to determine whether outputting of said registration information is permitted under said output condition acquired by said output condition acquisition means; and output means configured to output said registration information on the basis of a result of said decision means.

11. An information processing method for a terminal apparatus having acquisition means configured to acquire acquisition information and registration information, communication means configured to communicate with an information providing apparatus, and selection means configured to select a received category from said information providing apparatus, said information processing method comprising the steps of:

transmitting, by said communication means, first acquisition information that is said acquisition information to said information providing apparatus and receiving a plurality of categories for said first acquisition information from said information providing apparatus;

selecting, by said selection means, a first category from the received plurality of categories; and acquiring, by said acquisition means, said registration information related with said selected first category; and transmitting, by said communication means, said selected first category and said registration information related therewith to said information providing apparatus, after storing said first category and said registration information therein, transmitting second acquisition information that is said acquisition information to said information providing apparatus, and, if a second category that is said category of said second acquisition information corresponds to said first category, receiving said registration information from said information providing apparatus.

12. A non-transitory medium including instructions, executable by a processor in a computer, for causing the computer to:

acquire acquisition information and registration information, communicate with an information providing apparatus, and select a received category from said information providing apparatus, wherein the computer is further caused to:

transmit first acquisition information that is said acquisition information to said information providing apparatus and receive a plurality of categories for said first acquisition information from said information providing apparatus, select a first category from the received plurality of categories, acquire said registration information related with said selected first category, and transmit said selected first category and said registration information related therewith to said information providing apparatus and, after storing said first category and said registration information therein, transmit second acquisition information that is said acquisition information to said information providing apparatus, and, if a second category that is said category of said second acquisition information corresponds to said first category, receive said registration information from said information providing apparatus.

13. A terminal apparatus comprising:

acquisition means configured to acquire acquisition information and registration information;

recognition information configured to recognize a category corresponding to said acquired acquisition information;

selection means configured to select said category;

a storage configured to store said registration information as related with said category; and output means configured to output said registration information, wherein said recognition means recognizes a plurality of categories for said first acquisition information, said selection means selects a first category from the plurality of categories, said acquisition means acquires said registration information related with said selected first category, said storage stores said registration information as related with said selected first category, said acquisition means further acquires second acquisition information that is said acquisition information, said recognition means further recognizes a second category that is said category of said second acquisition information, and if said second category further recognized by said recognition means corresponds to said first category and a setting condition in said registration information corresponding to said first category is satisfied, said output means outputs said registration information.

14. An information processing method for a terminal apparatus having acquisition means configured to acquire acquisition information and registration information, recognition means configured to recognize a category corresponding to said acquired acquisition information, selection means configured to select said category, a storage configured to store said registration information as related with said category, and output means configured to output said registration information, said information processing method comprising the steps of:

recognizing, by said recognition means, a plurality of categories for said first acquisition information;

selecting, by said selection means, a first category from the plurality of categories;

acquiring, by said acquisition means, said registration information related with said selected first category;

storing, by said storage, said registration information as related with said selected first category;

further acquiring, by said acquisition means, second acquisition information that is said acquisition information;

further recognizing, by said recognition means, a second category that is said category of said second acquisition information; and if said second category further recognized by said recognition means corresponds to said first category and a setting condition in said registration information corresponding to said first category is satisfied, outputting, by said output means, said registration information.

15. A non-transitory medium including instructions, executable by a processor in a computer, for causing the computer to:

acquire acquisition information and registration information, recognize a category corresponding to said acquired acquisition information, select said category, store said registration information as related with said category, and output said registration information, wherein the computer is further caused to:

recognize a plurality of categories for said first acquisition information, select a first category from the plurality of categories, acquire said registration information related with said selected first category, store said registration information as related with said selected first category, acquire second acquisition information that is said acquisition information, recognize a second category that is said category of said second acquisition information, and if said second category corresponds to said first category and a setting condition in said registration information corresponding to said first category is satisfied, output said registration information.

16. An information providing apparatus, comprising:

a processor; and a storage configured to store registration information as related with a category, wherein the processor is configured to:

recognize said category corresponding to acquisition information acquired from a terminal apparatus; and transmit said registration information corresponding to said recognized category of said acquisition information to said terminal apparatus;

wherein the processor is further configured to:

receive first acquisition information that is said acquisition information from a first terminal apparatus;

recognize a plurality of categories for said first acquisition information acquired from said first terminal apparatus;

transmit the plurality of categories to said first terminal apparatus and receive a predetermined category selected from the plurality of categories by said first terminal apparatus and said registration information related therewith;

store said received registration information as related with said selected predetermined category;

receive second acquisition information that is said acquisition information from a second terminal apparatus and terminal information;

further recognize a second category that is said category of said second acquisition information acquired from said second terminal apparatus; and if said second category that is further recognized corresponds to said predetermined category and a setting condition in said registration information corresponding to said predetermined category is satisfied, transmit said registration information to said second terminal apparatus.

17. An information providing apparatus, comprising:

a processor configured to recognize a category corresponding to acquisition information acquired from a terminal apparatus, and communicate with said terminal apparatus; and a storage configured to store registration information received from said terminal apparatus as related with said category, wherein the processor is further configured to:

receive first acquisition information that is said acquisition information from a first terminal apparatus;

recognize a plurality of categories for said first acquisition information acquired from said first terminal apparatus;

transmit the plurality of categories to said first terminal apparatus and receive a first category selected from the plurality of categories by said first terminal apparatus and first registration information that is said registration information related therewith;

store said first registration information as related with said selected first category;

transmit, to a second terminal apparatus, terminal information of said first terminal apparatus in said first registration information and an information transmission request for transmitting second acquisition information that is said acquisition information acquired by said second terminal apparatus and receive said second acquisition information from said second terminal apparatus;

recognize a second category that is said category corresponding to said second acquisition information; and if said second category corresponds to said first category, transmit said second acquisition information to said first terminal apparatus.

18. A terminal apparatus, comprising:

a processor configured to acquire acquisition information and registration information, communicate with an information providing apparatus, and select a received category from said information providing apparatus; and a storage, wherein the processor is further configured to:

transmit first acquisition information that is said acquisition information to said information providing apparatus and receive a plurality of categories for said first acquisition information from said information providing apparatus;

select a first category from the received plurality of categories;

acquire said registration information related with said selected first category; and transmit said selected first category and said registration information related therewith to said information providing apparatus, after storing said first category and said registration information therein, transmit second acquisition information that is said acquisition information to said information providing apparatus, and, if a second category that is said category of said second acquisition information corresponds to said first category, receive said registration information from said information providing apparatus.

19. A terminal apparatus, comprising:

a processor configured to acquire acquisition information and registration information, recognize a category corresponding to said acquired acquisition information, select said category, and output said registration information; and a storage configured to store said registration information as related with said category;

wherein the processor is further configured to:

recognize a plurality of categories for first acquisition information;

select a first category from the plurality of categories;

acquire said registration information related with said selected first category;

store said registration information as related with said selected first category;

further acquire second acquisition information that is said acquisition information;

further recognize a second category that is said category of said second acquisition information; and if said second category that is further recognized corresponds to said first category and a setting condition in said registration information corresponding to said first category is satisfied, output said registration information.

* * * * *